(12) United States Patent
Yakura et al.

(10) Patent No.: US 7,530,743 B2
(45) Date of Patent: May 12, 2009

(54) DOUBLE ROW CYLINDRICAL ROLLER BEARING

(75) Inventors: Kenji Yakura, Kanagawa (JP); Takaaki Anzai, Kanagawa (JP); Ken Inaba, Kanagawa (JP); Yasushi Morita, Kanagawa (JP)

(73) Assignee: NSK Ltd., Tokyo (JP)

( * ) Notice: Subject to any disclaimer, the term of this patent is extended or adjusted under 35 U.S.C. 154(b) by 730 days.

(21) Appl. No.: 10/489,200

(22) PCT Filed: Sep. 10, 2002

(86) PCT No.: PCT/JP02/09230

§ 371 (c)(1),
(2), (4) Date: Oct. 13, 2004

(87) PCT Pub. No.: WO03/029670

PCT Pub. Date: Apr. 10, 2003

(65) Prior Publication Data

US 2005/0041901 A1 Feb. 24, 2005

(30) Foreign Application Priority Data

Sep. 10, 2001 (JP) ............................. 2001-273835
May 14, 2002 (JP) ............................. 2002-138843

(51) Int. Cl.
*F16C 33/48* (2006.01)
*F16C 19/00* (2006.01)
(52) U.S. Cl. ...................... 384/572; 384/470
(58) Field of Classification Search ................ 384/470, 384/572–580

See application file for complete search history.

(56) References Cited

U.S. PATENT DOCUMENTS 2,375,145 A * 5/1945 Styri ........................ 384/577
5,316,394 A * 5/1994 Gehring ..................... 384/574
5,352,047 A * 10/1994 Ingall et al. ................. 384/572
6,315,459 B1  11/2001 Takano et al.

FOREIGN PATENT DOCUMENTS

| DE | 2703966 A1 | 8/1978 |
| DE | 198 45 051 A1 | 4/1999 |
| EP | 1 098 099 A1 | 5/2001 |
| JP | 41-21846 B1 | 12/1966 |
| JP | 43-20807 B1 | 9/1968 |

(Continued)

*Primary Examiner*—Richard W L Ridley
*Assistant Examiner*—James Pilkington
(74) *Attorney, Agent, or Firm*—Sughrue Mion, PLLC

(57) ABSTRACT

A cylindrical roller bearing with synthetic resin cages, in which heat generation of the bearing during high speed rotation is suppressed, while sufficient rigidity and strength is secured, so that the bearing is excellent in high speed performance. The cylindrical roller bearing (10) has synthetic resin cages (20) each including an annular portion (21) disposed in one axial end portion of the cage (20), and a plurality of columnar portions (25) extending from a side surface of the annular portion (21). The minimum inner diameter d1 of the annular portion (21) is set to be smaller than the maximum inner diameter d2 of each columnar portion (25), and the inner diameter of the columnar portion (25) is set to be equal to the inner diameter d1 of the annular portion (21) over a range of length not longer than ⅔ of the whole length of the columnar portion (25).

2 Claims, 21 Drawing Sheets

FOREIGN PATENT DOCUMENTS

| | | |
|---|---|---|
| JP | 52-44359 A | 4/1977 |
| JP | 55-38021 | 3/1980 |
| JP | 6-249246 A | 9/1994 |
| JP | 8-28576 A | 2/1996 |
| JP | 8-128450 A | 5/1996 |
| JP | 408184320 * | 7/1996 |
| JP | 9-177771 A | 7/1997 |
| JP | 11-166544 A | 6/1999 |
| JP | 11230174 | 8/1999 |
| JP | 2000-145790 A | 5/2000 |
| JP | 2000-220644 A | 8/2000 |
| JP | 2001082488 | 3/2001 |
| JP | 2001-208076 A | 8/2001 |
| JP | 2001-208876 A | 8/2001 |
| JP | 2002-106575 A | 4/2002 |
| WO | WO 03/029670 A1 | 4/2003 |

* cited by examiner

US 7,530,743 B2

DOUBLE ROW CYLINDRICAL ROLLER BEARING

TECHNICAL FIELD

The present invention relates to a roller bearing and a double row cylindrical roller bearing, and particularly relates to a synthetic resin cage to be incorporated in a roller bearing or a double row cylindrical roller bearing requested to have low heat generation under such an environment that the roller bearing supports a rotary piece rotated at a high speed under lubrication with a very small amount of grease or lubricating oil, such as a shaft driven by a motor, or a main shaft of a machine tool, or the like.

BACKGROUND ART

Conventionally, bearings for bearing main shafts of machine tools rotatably are requested to have properties of high rigidity, high rotational accuracy and low heat generation in order to keep the machining accuracy.

From the point of view of high rigidity, cylindrical roller bearings are generally used as bearings of machine tools. In recent years, single row and double row cylindrical roller bearings withstanding high speed rotation and having long lives have been desired from a rapidly increasing demand for improvement in productivity.

A so-called machined cage made from a copper alloy is used as a cage of a cylindrical roller bearing in the background art. However, when the machined cage is in use under high speed rotation, there is a disadvantage that the inner and outer circumferential surfaces and the pocket inner surface of the cage touch the rolling contact surface of an inner ring or an outer ring and cylindrical rollers so as to be worn to generate abrasive metallic particle. When the abrasive metallic particle is mixed into grease, there is a problem that the lubricating performance is degraded conspicuously to thereby cause seizing or damage.

In recent years, a cage made from synthetic resin has come to be adopted as a cage for solving the foregoing problem. The cage made from synthetic resin is formed by injection molding out of a raw material having a proper amount of reinforcements such as glass fiber or the like mixed into synthetic resin such as polyamide resin or the like.

The cage made from synthetic resin is indeed superior in abrasion resistance, but inferior in rigidity and strength to a cage made from metal. When the cage made from synthetic resin is used in a bearing rotating at a high speed, there is a possibility that the cage is damaged by a force acting on the cage.

Therefore, Japanese Patent Laid-Open No. 166544/1999 has proposed a cage 1 made from synthetic resin, in which a large number of cantilever-like columnar portions 1b are provided at predetermined intervals to project laterally from an annular portion 1a molded like a ring, as shown in FIGS. 31 and 32.

The same publication has disclosed a double row cylindrical roller bearing 5 using the cages 1 made from synthetic resin. That is, cylindrical rollers 2 each retained rotatably in a pocket portion between adjacent ones of the columnar portions 1b are disposed to roll desirably between an outer ring 3 and an inner ring 4.

In each synthetic resin cage 1 of the double row cylindrical roller bearing 5, an excessive circumferential force acting on the columnar portion 1b from the cylindrical roller 2 in accordance with the high speed rotation is absorbed by the elastic deformation of the columnar portion 1b by use of the elasticity of the synthetic resin. Thus, the cage 1 is prevented from being damaged.

According to the aforementioned cages 1 in the background art, when the bearing 5 rotates at a high speed, a large centrifugal force proportional to the square of the rotational speed acts on the cages 1 so that the cantilever-like columnar portions 1b are displaced in the arrow B direction (outer diameter direction) as shown in FIG. 33. With this displacement, the annular portions 1a are distorted so that the cages 1 are deformed elastically, According to the inner ring guide type cages 1 shown in FIG. 33, due to the elastic deformation, interference occurs between the outer diameter sides of the outer side surfaces 1c of the annular portions 1a, between the outer side surface 1c of the inner diameter portion of each annular portion 1a and the inner ring 4, and between the inner diameter side of the inner side surface 1d of each annular portion 1a and the side surface of each cylindrical roller 2. Thus, there occurs a strong pressing force therebetween. This pressing force is proportional to the square of the rotational speed. Thus, with the higher speed rotation, the pressing force increases at an exponential rate so that a large force acts.

When rotation is made at a high speed in the state where these portions are pressed strongly, heat is generated due to friction so that the deterioration of charged grease or lubricating oil due to heat is accelerated. Thus, the lubricating performance is degraded. In addition, there is a problem that the contact portions of the cages 1, the inner ring 4 or the cylindrical rollers 2 are worn locally so that the life of the bearing is shortened.

In addition, also in an outer ring riding cage or a roller riding cage, interference portions are indeed difficult from those in the inner ring riding cage, but there is a serious problem of heating, wearing and so on due to similar interference caused by the elastic deformation of the cage due to centrifugal force.

In addition, the interference of each part also causes a fluctuation of torque. Thus, there is a possibility that the stabilization of the rotational accuracy is obstructed.

Therefore, the present invention was developed in consideration of the foregoing problems. It is an object of the invention to provide a roller bearing and a double row cylindrical roller bearing in which occurrence of interference among cages, an inner ring and rollers is prevented in spite of elastic deformation of the cages due to centrifugal force acting on the cages during high speed rotation, so that the bearing is low in heat generation, with stands high-speed rotation with a very small amount of lubricant, and has a long life.

DISCLOSURE OF THE INVENTION

As a result of diligent investigations of the present inventors, it has been found that devising the shape of a cage made from synthetic resin can enhance the rigidity thereof so that heat generation of a bearing even during rotation at a high speed not lower than a dmN value of 1,000,000 (dm: pitch circle diameter, N: shaft rotation number) can be suppressed conspicuously.

The foregoing object of the present invention is attained by a roller bearing including a cage made from synthetic resin, which cage includes an annular portion disposed in an axial end portion of the cage, and a plurality of columnar portions extending from a side surface of the annular portion, the roller bearing being characterized in that a minimum inner diameter of the aforementioned annular portion is made smaller than a maximum inner diameter of each aforementioned columnar portion, and an inner diameter of the aforementioned columnar portion is made equal to an inner diameter of the annular portion over a range of length not longer than 2/3 of the whole length of the aforementioned columnar portion.

In addition, the foregoing object of the present invention is attained by a roller bearing including a cage made from synthetic resin, which cage includes an annular portion disposed in an axial end portion of the cage, and a plurality of columnar portions extending from a side surface of the annular portion, the roller bearing being characterized in that a minimum inner diameter of the aforementioned annular portion is made smaller than a maximum inner diameter of each aforementioned columnar portion, and an inner diameter of the aforementioned columnar portion is made equal to an inner diameter of the aforementioned annular portion over a range of length not longer than 1/3 of the whole length of the aforementioned columnar portion, while a maximum outer diameter of the aforementioned annular portion is made larger than a minimum outer diameter of the aforementioned columnar portion, and an outer diameter of the aforementioned columnar portion is made equal to an outer diameter of the aforementioned annular portion over a range of length shorter than 1/3 of the whole length of the aforementioned columnar portion.

Incidentally, according to a preferred embodiment, the aforementioned cage made from synthetic resin is guided by a ring such as an inner ring, an outer ring or the like when the cage is incorporated in a roller bearing.

With the above configuration, in comparison with a synthetic resin cage in the background art, the quantity of bending of each columnar portion toward the outer circumferential side due to action of the centrifugal force can be suppressed, while the maximum stress applied to the cage (stress on the connecting portion between the annular portion and the columnar portion) can be also suppressed. According to the roller bearing provided with the synthetic resin cage configured thus, heat generation of the bearing during high speed rotation can be suppressed, while sufficient rigidity and strength can be secured so that excellent high speed performance can be obtained.

In addition, for example, when the annular portion thickened in its radial dimension in the synthetic resin cage configured thus may be guided by a ring, the strength of the cage can be more improved.

The aforementioned synthetic resin cage can be formed by injection molding out of a material containing thermoplastic synthetic resin such as polyamide 66, polyamide 46, polyphenylene sulfide, polyacetal, or the like, as a base material, and about 10-30 wt % of glass fiber added to the thermoplastic synthetic resin for improving the strength. However, when the synthetic resin cage is requested to have especially sufficient elasticity in accordance with applications, it can be also considered that no additive material such as glass fiber or the like is added. In addition, as the aforementioned thermoplastic synthetic resin serving as a base material, polyamide 66 is preferred in view of price or function such as strength, chemical stability and the like, when the synthetic resin cage is used for a cylindrical roller bearing for supporting a main shaft of a general machine tool. On the other hand, polyamide 46 is preferred when the temperature conditions during normal operation or during running in are conspicuously harsh (high temperature), or when more excellent fatigue strength or rigidity is required. Polyphenylene sulfide is preferred when dimensional stability against high temperature, chemicals or humidity (moisture absorption) is especially requested, Polyacetal is preferred when abrasion resistance is especially requested.

Further, the aforementioned object of the present invention is attained by a double row cylindrical roller bearing including cages each including an annular portion molded like a ring and a plurality of columnar portions disposed circumferentially at predetermined intervals and molded to project axially from an inner side surface of the annular portion, the cages being formed integrally out of synthetic resin and rotatably retaining a plurality of rows of cylindrical rollers disposed in a plurality of pocket portions each surrounded in three sides thereof by circumferential opposite side surfaces of adjacent two of the aforementioned columnar portions and the aforementioned inner side surface of the aforementioned annular portion so that the cylindrical rollers roll desirably between an outer ring and an inner ring, the double row cylindrical roller bearing being characterized in that in order to prevent interference among members from occurring due to elastic deformation of the cages caused by centrifugal force during rotation, a shape of each interference portion is eliminated beforehand correspondingly to the aforementioned elastic deformation and formed into a tapered shape.

With the above configuration, in each synthetic resin cage including an annular portion and a plurality of columnar portions each projecting like a cantilever laterally from the annular portion, a part of the cage which will be deformed elastically due to centrifugal force is estimated, and formed into a tapered shape in which the shape of a portion which will lead to interference due to elastic deformation is eliminated.

Accordingly, even if the front end of each columnar portion is displaced outward in the radial direction due to centrifugal force when the bearing is rotated at a high speed, and the annular portions are distorted so that the cages are deformed elastically, it is possible to avoid interference between the cages or between each cage and each ring. In addition, heat generation due to friction, and torque fluctuation can be reduced, while local abrasion can be prevented. Thus, it is possible to obtain a double row cylindrical roller bearing which can withstand high speed rotation stably over a long term with a very small amount of lubricant, and which is low in torque fluctuation and long in life, In addition, the foregoing object of the present invention is attained by a double row cylindrical roller bearing including inner ring guide type cages each including an annular portion molded like a ring and having an inner diameter portion guided on an outer circumferential surface of an inner ring so as to be limited in radial position, and a plurality of columnar portions disposed circumferentially at predetermined intervals and molded to project axially from an inner side surface of the annular portion, the cages being formed integrally out of synthetic resin and rotatably retaining a plurality of rows of cylindrical rollers disposed in a plurality of pocket portions each surrounded in three sides thereof by circumferential opposite side surfaces of adjacent two of the aforementioned columnar portions and the aforementioned inner side surface of the aforementioned annular portion so that the cylindrical rollers can roll desirably between an outer ring and the aforementioned inner ring, the double row cylindrical roller bearing being characterized in that an outer side surface of the aforementioned annular portion is formed into a tapered surface in which an axial dimension of the aforementioned annular portion is reduced gradually as it goes from the inner diameter side of the aforementioned annular portion to the outer diameter side thereof, while the inner diameter portion of the aforementioned annular portion is formed as a tapered hole in which an inner diameter dimension of the aforementioned annular portion is increased gradually as it goes from the aforementioned inner side surface of the annular portion to the aforementioned outer side surface thereof.

With the above configuration, a taper is provided in the outer side surface of each annular portion so that the axial dimension of the annular portion is reduced gradually as it goes from the inner diameter side of the annular portion to the outer diameter side thereof, while a taper is provided in the inner diameter portion so that the inner diameter dimension is increased gradually as it goes from the inner side surface of the annular portion to the outer side surface thereof.

Accordingly, even if the annular portions are distorted and elastically deformed due to centrifugal force during rotation, it is possible to avoid interference between the outer diameter sides of the outer side surfaces of the annular portions and between the outer side surface side of the inner diameter portion of each annular portion and the inner ring.

As a result, heat generation due to friction, torque fluctuation and local abrasion can be prevented, while deterioration of lubricant due to heat can be prevented, and local abrasion of the cage, the inner ring or the cylindrical rollers can be prevented. Thus, it is possible to obtain a double row cylindrical roller bearing which can withstand high speed rotation stably over a long term with a very small amount of lubricant, and which is low in torque fluctuation and long in life.

In addition, the foregoing object of the present invention is attained by a double row cylindrical roller bearing including outer ring guide type cages each including an annular portion molded like a ring and having an outer diameter portion guided on an inner circumferential surface of an outer ring so as to be limited in radial position, and a plurality of columnar portions disposed circumferentially at predetermined intervals and molded to project axially from an inner side surface of the annular portion, the cages being formed integrally out of synthetic resin and rotatably retaining a plurality of rows of cylindrical rollers disposed in a plurality of pocket portions each surrounded in three sides thereof by circumferential opposite side surfaces of adjacent two of the aforementioned columnar portions and the aforementioned inner side surface of the aforementioned annular portion so that the cylindrical rollers can roll desirably between the aforementioned outer ring and an inner ring, the double row cylindrical roller bearing being characterized in that an outer side surface of the aforementioned annular portion is formed into a tapered surface in which an axial dimension of the aforementioned annular portion is reduced gradually as it goes from the inner diameter side of the aforementioned annular portion to the outer diameter side thereof, while the outer diameter portion of the aforementioned annular portion is formed as a tapered shape in which an outer diameter dimension of the annular portion is reduced gradually as it goes from the aforementioned outer side surface of the annular portion to the aforementioned inner side surface thereof.

With the above configuration, a taper is provided in the outer side surface of each annular portion so that the axial dimension of the annular portion is reduced gradually as it goes from the inner diameter side of the annular portion to the outer diameter side thereof, while a taper is provided in the outer diameter portion so that the outer diameter dimension is reduced gradually as it goes from the outer side surface of the annular portion to the inner side surface thereof.

Accordingly, even if the cages are elastically deformed due to centrifugal force, it is possible to avoid interference between the outer side surfaces on the outer diameter sides of the annular portions and between the inner side surface side of the outer diameter portion of each annular portion and the outer ring. As a result, heat generation due to friction, deterioration of lubricant due to heat, and occurrence of torque fluctuation can be suppressed, while local abrasion of the cages, the outer ring and the cylindrical rollers can be pre-vented. Thus, it is possible to obtain a double row cylindrical roller bearing which can withstand high speed rotation stably over a long term with a very small amount of lubricant, and which is low in torque fluctuation and long in life.

In addition, the foregoing object of the present invention is attained by a double row cylindrical roller bearing including roller guide type cages each including an annular portion molded like a ring and guided by a plurality of cylindrical rollers so as to be limited in radial position, and a plurality of columnar portions disposed circumferentially at predetermined intervals and molded to project axially from an inner side surface of the annular portion, the cylindrical rollers being disposed to roll desirably in a plurality of rows between an outer ring and an inner ring, the cages being formed integrally out of synthetic resin and rotatably retaining the aforementioned rollers in a plurality of pocket portions each surrounded in three sides thereof by circumferential opposite side surfaces of adjacent two of the aforementioned columnar portions and the aforementioned inner side surface of the aforementioned annular portion, the double row cylindrical roller bearing being characterized in that an outer side surface of the aforementioned annular portion is formed into a tapered surface in which an axial dimension of the aforementioned annular portion is reduced gradually as it goes from the inner diameter side of the annular portion to the outer diameter side thereof.

With the above configuration, a taper is formed and provided in the outer side surface of each annular portion so that the axial dimension of the annular portion is reduced gradually as it goes from the inner diameter side of the annular portion to the outer diameter side thereof. Accordingly, even if the cages are elastically deformed due to centrifugal force, there is no fear that the outer diameter sides of the outer side surfaces of the annular portions interfere with each other.

In addition, heat generation due to friction, deterioration of lubricant due to heat, and torque fluctuation due to interference among parts can be suppressed. Thus, it is possible to obtain a double row cylindrical roller bearing which can withstand high speed rotation stably over a long term with a very small amount of lubricant, and which is low in torque fluctuation and long in life.

Further, the foregoing object of the present invention is attained by a double row cylindrical roller bearing including cages made from synthetic resin and each including an annular portion disposed on the inner end side of each roller row coaxially therewith between inner and outer rings of the double row cylindrical roller bearing, and a plurality of columnar portions projecting axially from a roller-side end surface of the annular portion, intervals of rollers on each roller row being retained by bearing-circumferential opposite side surfaces of each columnar portion and the roller-side end surface of each aforementioned annular portion, pockets being arranged to have roller-propped portions guided by the roller rows respectively, the double row cylindrical roller bearing being characterized in that at least a part of each of the bearing-circumferential opposite side surfaces of each aforementioned columnar portion is formed into a straight surface preventing contact pressure in a radial direction of the bearing from acting on each cylindrical roller in contact therewith, while an array of protrusions are provided in the bearing-inner-diameter-side end portions of the bearing-circumferential opposite side surfaces of each columnar portion so as to satisfy $H1<H3 \leqq H2$ when in the bearing-circumferential opposite side surfaces of each aforementioned columnar portion opposed to each other in the circumferential direction of the bearing, $H1$ designates a spacing distance between roller-propped portions provided on the outer diameter side of the aforementioned columnar portion and guided by the rollers, H2 designates a spacing distance between the aforementioned straight surfaces, and H3 designates a spacing distance between the bearing-inner-diameter-side end portions.

With the above configuration, due to the protrusion array provided in the bearing-inner-diameter-side end portions of the bearing-circumferential opposite side surfaces of the respective columnar portions, lubricant can be retained in the bearing-circumferential opposite side surfaces. Thus, temperature rise, occurrence of abnormal noise, deterioration of rotating performance and so on caused by the shortage of lubricant can be prevented.

In such a manner, even when the bearing is rotated at a high speed under lubrication with a very small amount of lubricant (grease, lubricating oil, or the like), excellent low noise characteristic can be secured, and high-speed stability and durability can be further improved.

Incidentally, according to a preferred embodiment, the configuration is adapted so that when R designates a chamfering radius of each aforementioned roller-propped portion, and Da designates an outer diameter of each aforementioned cylindrical roller, the aforementioned chamfering radius R is set to satisfy R/Da=0.05 to 0.2.

With the above configuration, the contact pressure between each cylindrical roller and each roller-propped portion can be suppressed to be so low that temperature rise due to increase in contact pressure between the cylindrical roller and the roller-propped portion can be avoided. Thus, the lowering of the bearing performance caused by the temperature rise is suppressed so that the improvement in high speed stability or durability can be further advanced.

Accordingly, even when the cages are elastically deformed due to centrifugal force acting on the cages during high speed rotation, interference among the cages, the inner ring and the rollers is prevented from occurring. Thus, it is possible to obtain a roller bearing and a double row cylindrical roller bearing which has low heat generation, which can withstand high speed rotation with a very small amount of lubricant, and which is long in life.

BEST MODE FOR CARRYING OUT THE INVENTION

Embodiments of the present invention will be described below in detail with reference to the drawings. Double row roller bearings will be described by way of example. The present invention is not limited to the double row roller bearings, but may be applicable to single row roller bearings.

Figure 1:
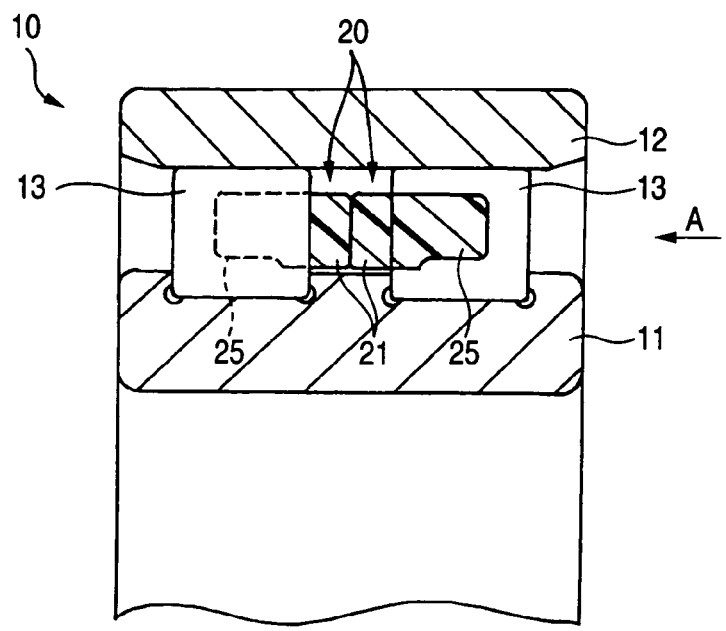
FIG. 1 is a sectional view of a cylindrical roller bearing according to an embodiment of the present invention.

As shown in FIG. 1, a cylindrical roller bearing 10 is designed so that two rows of a plurality of cylindrical rollers 13 are disposed between an inner ring 11 and an outer ring 12. The plurality of cylindrical rollers 13 in each row are retained rotatably at an equal circumferential interval by a cage 20 made from synthetic resin. The cylindrical roller bearing 10 is lubricated with a very small amount of grease. However, the invention is not limited to this, but the cylindrical roller bearing 10 may be lubricated with a very small amount of lubricating oil or a mixture of grease and lubricating oil.

In this embodiment, the synthetic resin cages 20 are guided by the inner ring 11. That is, the cages 20 rotate with the rotation of the inner ring 11.

In this embodiment, a pair of cages 20 and 20 having one and the same shape are incorporated in the cylindrical roller bearing 10. Each cage 20 has an annular portion 21 disposed in one axial end portion thereof, and a plurality of columnar portions 25 extending axially at an equal circumferential interval from a side surface of the annular portion 21.

In this embodiment, the paired cages 20 and 20 having one and the same shape face each other in their side surfaces opposite to the side where the columnar portions 25 of the annular portions 21 and 21 are provided.

However, the synthetic resin cages are not limited to such a shape. For example, a pair of cages are not made to face each other, but a cage molded integrally may be used. That is, a cage in which columnar portions are molded integrally on the opposite side surfaces of an annular portion may be used.

Figure 2:
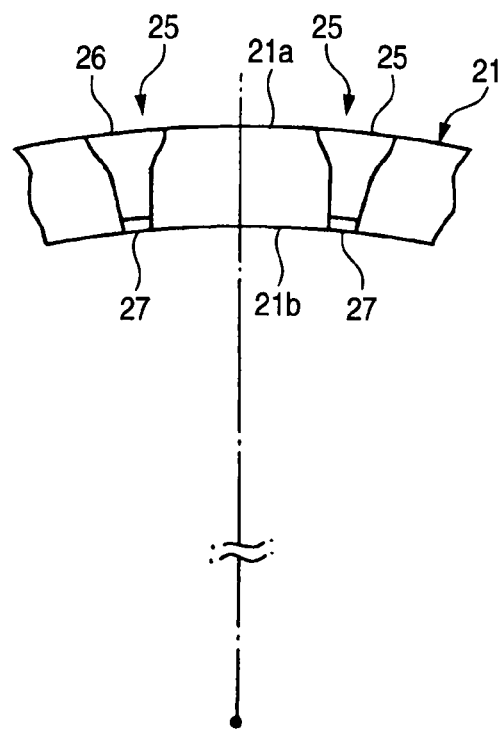
FIG. 2 is a side view from arrow A in FIG. 1.

FIG. 2 shows a side view from arrow A, showing the state where the cylindrical rollers 13 in FIG. 1 have been removed. As shown in FIG. 2, an outer diameter surface 26 of each columnar portion 25 is disposed on the same circumference as an outer diameter surface 21a of each annular portion 21 in side view. On the other hand, a part (part on the annular portion 21 side) of an inner diameter surface 27 of each columnar portion 25 is disposed on the same circumference as an inner diameter surface 21b of each annular portion 21 in side view, Each columnar portion 25 has a width (circumferential dimension) reduced as it goes from the outer diameter surface 26 to the inner diameter surface 27.

Figure 3:
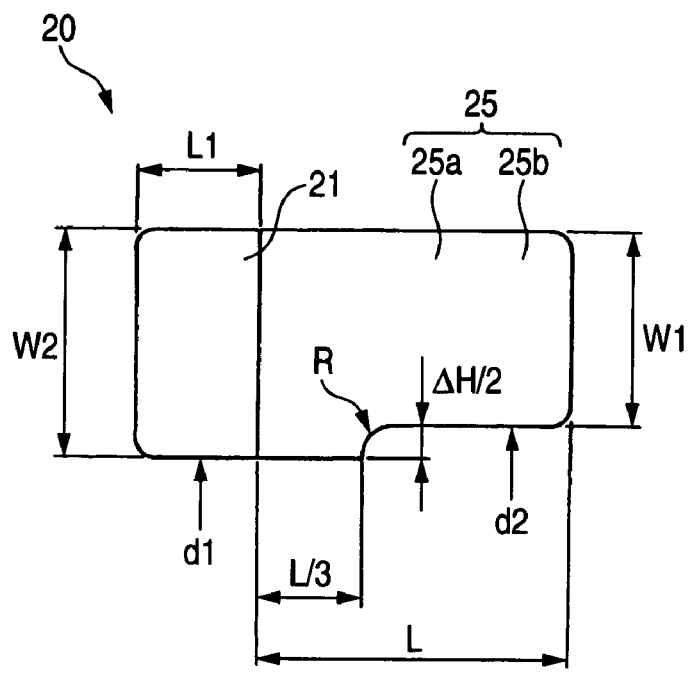
FIG. 3 is an enlarged view of a main portion in a first embodiment.

FIG. 3 shows an enlarged view of the synthetic resin cage 20 shown in FIG. 1. In FIG. 3, hatching is omitted.

The columnar portion 25 in this embodiment includes a base portion (thick portion) 25a having an inner diameter as large as the inner diameter d1 of the annular portion 21, and a front end portion (thin portion) 25b having an inner diameter d2 larger than the inner diameter d1 of the annular portion 21. The axial dimension of the base portion 25a is set to be ⅓ of the whole length L of the columnar portion 25.

The inner diameter surface of the annular portion 21 is flush with the inner diameter surface of the base portion 25a. The inner diameter surface of the base portion 25a and the inner diameter surface of the front end portion 25b are connected smoothly through a curved surface R. That is, the connecting portion between the inner diameter surface of the base portion 25a and the inner diameter surface of the front end portion 25b is rounded with a radius R. The outer diameter surface of the annular portion 21, the outer diameter surface of the base portion 25a and the outer diameter surface of the front end portion 25b are flush with one another.

Figure 4:
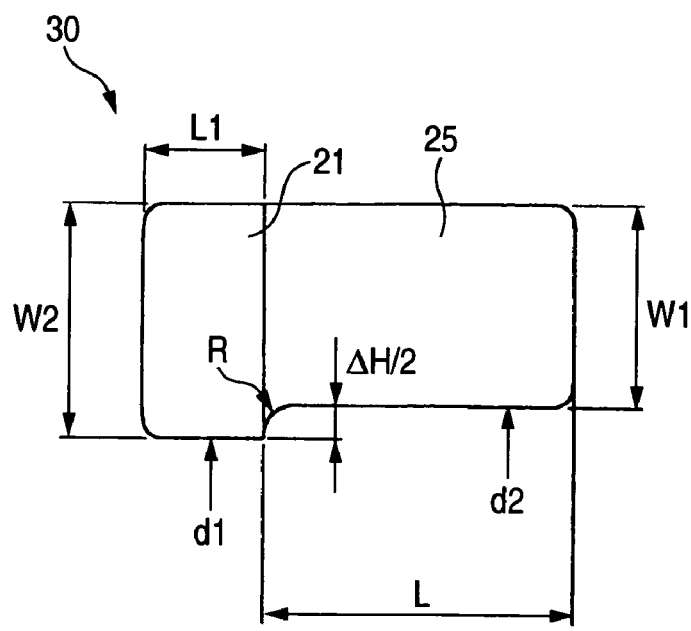
FIG. 4 is an enlarged view of a main portion in a second embodiment.

FIG. 4 shows a main portion of a synthetic resin cage 30 according to a second embodiment of the present invention. Incidentally, in the embodiments which will be described below, members and so on having configurations/operations similar to those of the members and so on described previously are denoted by the same or equivalent reference numerals in the drawings, and description thereof will be simplified or omitted.

Each columnar portion 35 in this embodiment includes no portion having an inner diameter as large as the inner diameter d1 of the annular portion 21. The columnar portion 35 has an inner diameter d2 larger than the inner diameter d1 of the annular portion 21 over the whole length L of the columnar portion 35. The connecting portion between the inner diameter surface of the annular portion 21 and the inner diameter surface of the columnar portion 35 is rounded with a radius R. The outer diameter surface of the annular portion 21 is flush with the outer diameter surface of the columnar portion 35.

Figure 5:
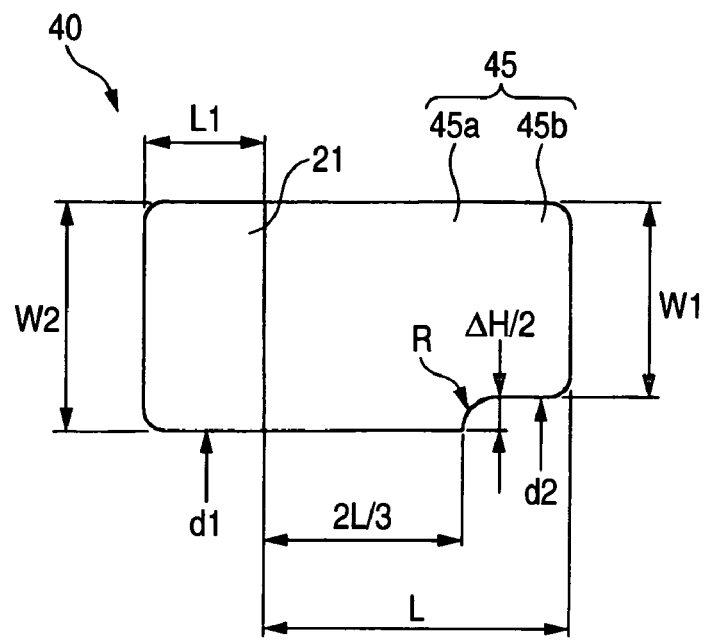
FIG. 5 is an enlarged view of a main portion in a third embodiment.

FIG. 5 shows a main portion of a synthetic resin cage 40 according to a third embodiment of the present invention. Each columnar portion 45 in this embodiment includes a base portion (thick portion) 45a having an inner diameter as large as the inner diameter d1 of the annular portion 21, and a front end portion (thin portion) 45b having an inner diameter d2 larger than the inner diameter d1 of the annular portion 21.

The axial dimension of the base portion 45a is set to be ⅔ of the whole length of the columnar portion 45.

The inner diameter surface of the annular portion 21 is flush with the inner diameter surface of the base portion 45a. The connecting portion between the inner diameter surface of the base portion 45a and the inner diameter surface of the front end portion 45b is rounded with a radius R. The outer diameter surface of the annular portion 21, the outer diameter surface of the base portion 45a and the outer diameter surface of the front end portion 45b are flush with one another.

Figure 6:
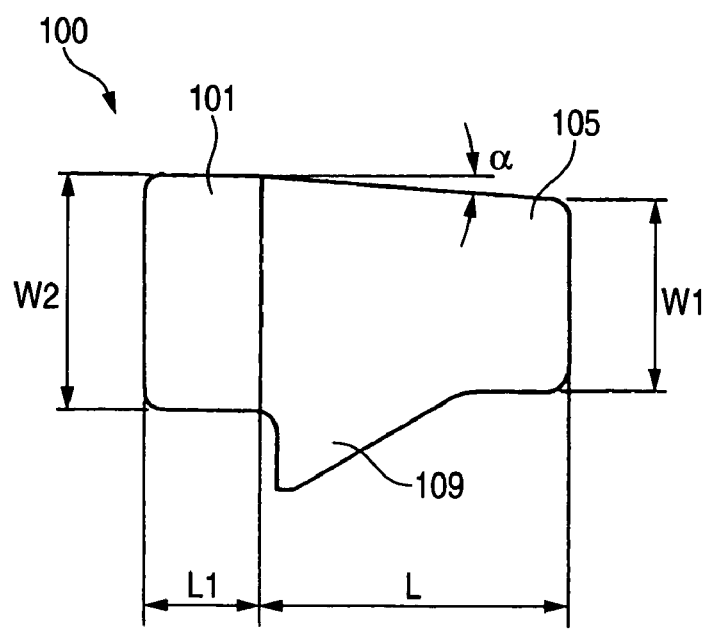
FIG. 6 is a view showing a product in the background art.

In order to make comparison, FIG. 6 shows an example (Comparative Example 1) of a synthetic resin cage in the background art. A protrusion portion 109 projecting on the inner circumferential side of the inner diameter surface of an annular portion 101 is formed in the inner diameter surface of each columnar portion 105 in this cage 100. The outer diameter surface of the annular portion 101 is not flush with the outer diameter surface of the columnar portion 105. The outer diameter surface of the columnar portion 105 tilts at an angle a so that the outer diameter of the columnar portion 105 is reduced as it approaches its front end portion.

Figure 7:
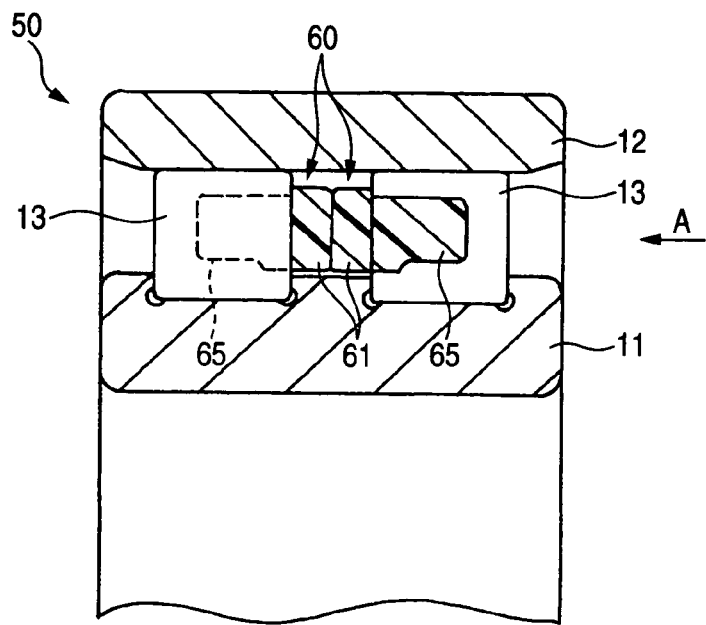
FIG. 7 is a sectional view of a cylindrical roller bearing according to an embodiment of the present invention.

FIG. 7 shows a cylindrical roller bearing 50 in which synthetic resin cages 60 according to a fourth embodiment of the present invention are incorporated. In this embodiment, the synthetic resin cages 60 are guided on the inner ring 11. In this embodiment, the outer diameter of an annular portion 61 of each synthetic resin cage 60 is larger than the outer diameter of each columnar portion 65.

Figure 8:
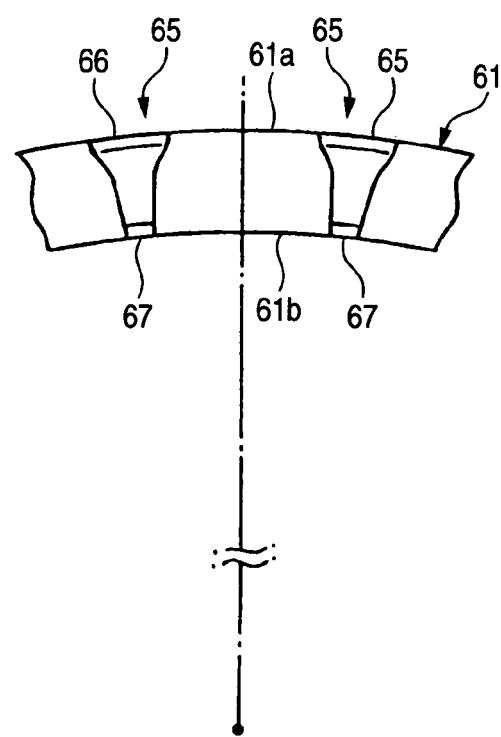
FIG. 8 is a side view from arrow A in FIG. 7.

FIG. 8 shows a side view from arrow A, in which the cylindrical rollers 13 in FIG. 7 have been removed. As shown in FIG. 8, a part (part on the annular portion 61 side) of an outer diameter surface 66 of each columnar portion 65 is disposed on the same circumference as an outer diameter surface 61a of the annular portion 61 in side surface view. In addition, a part (part on the annular portion 61 side) of an inner diameter surface 67 of each columnar portion 65 is disposed on the same circumference as an inner diameter surface 61b of the annular portion 61 in side surface view. Each columnar portion 65 has a width (circumferential dimension) reduced as it goes from the outer diameter surface 66 to the inner diameter surface 67.

Figure 9:
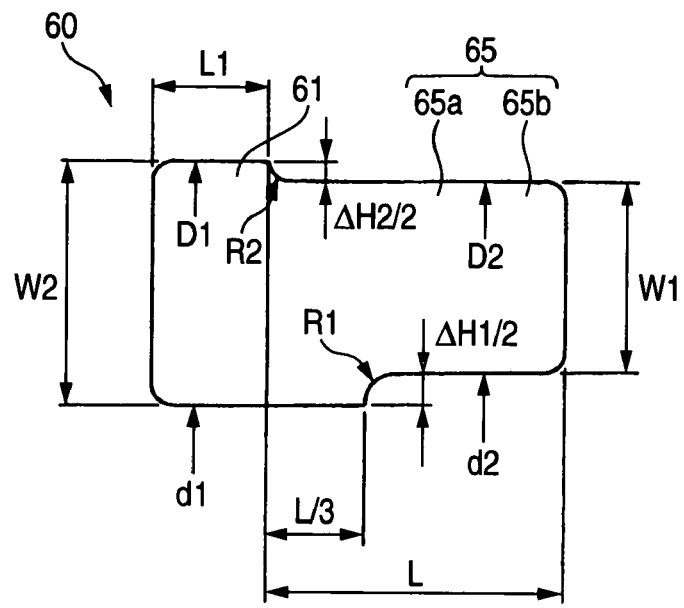
FIG. 9 is an enlarged view of a main portion in a fourth embodiment.

FIG. 9 shows an enlarged view of the synthetic resin cage 60 shown in FIG. 7. In FIG. 9, hatching is omitted.

Each columnar portion 65 in this embodiment includes a base portion (thick portion) 65a having an inner diameter as large as the inner diameter d1 of the annular portion 61, and a front end portion (thin portion) 65b having an inner diameter d2 larger than the inner diameter d1 of the annular portion 61. The axial dimension of the base portion 65a is set to be ⅓ of the whole length L of the columnar portion 65.

The inner diameter surface of the annular portion 61 is flush with the inner diameter surface of the base portion 65a. The connecting portion between the inner diameter surface of the base portion 65a and the inner diameter surface of the front end portion 65b is rounded with a radius R1. The uniform outer diameter D2 of the columnar portion 65 is smaller than the outer diameter D1 of the annular portion 61. The connecting portion between the outer diameter surface of the annular portion 61 and the outer diameter surface of the columnar portion 65 (base portion 65a) is rounded with a radius R2.

Figure 10:
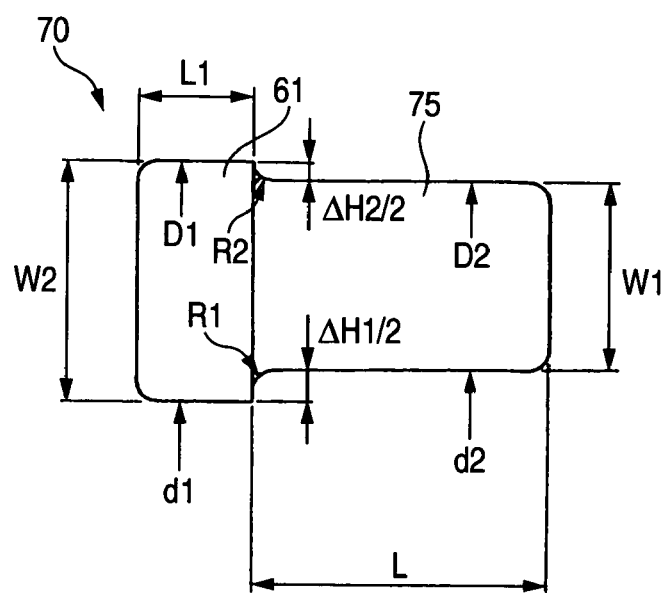
FIG. 10 is an enlarged view of a main portion in a fifth embodiment.

FIG. 10 shows a main portion of a synthetic resin cage 70 according to a fifth embodiment of the present invention, Each columnar portion 75 in this embodiment includes no portion having an inner diameter as large as the inner diameter d1 of the annular portion 61. The columnar portion 75 has an inner diameter d2 larger than the inner diameter d1 of the annular portion 61 over the whole length L of the columnar portion 75. The connecting portion between the inner diameter surface of The annular portion 61 and the inner diameter surface of the Columnar portion 75 is rounded with a radius R1. The uniform outer diameter D2 of the columnar portion 75 is smaller than the outer diameter D1 of the annular portion 61. The connecting portion between the outer diameter surface of the annular portion 61 and the outer diameter surface of the columnar portion 75 is rounded with a radius R2.

Figure 11:
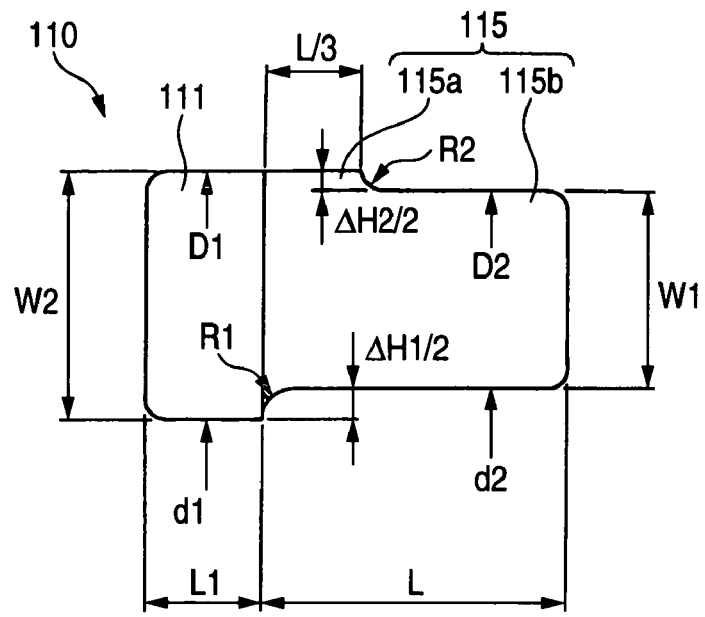
FIG. 11 is a view showing a comparative example.

In order to make comparison, FIG. 11 shows an example (Comparative Example 2) of a synthetic resin cage which is out of the present invention. In this cage 110, each columnar portion 115 includes no portion having an inner diameter as large as the inner diameter d1 of an annular portion 111. The columnar portion 115 has an inner diameter d2 larger than the inner diameter d1 of the annular portion 111 over the whole length L of the columnar portion 115. The connecting portion between the inner diameter surface of the annular portion 111 and the inner diameter surface of the columnar portion 115 is rounded with a radius R1. The columnar portion 115 has a base portion 115a having an outer diameter as large as the outer diameter D1 of the annular portion 111, and a front end portion 115b having an outer diameter D2 smaller than the outer diameter D1 of the annular portion 111. The axial dimension of the base portion 115a is set to be ⅓ of the whole length L of the columnar portion 115. The connecting portion between the outer diameter surface of the base portion 115a and the outer diameter surface of the front end portion 115b is rounded with a radius R2.

Figure 12:
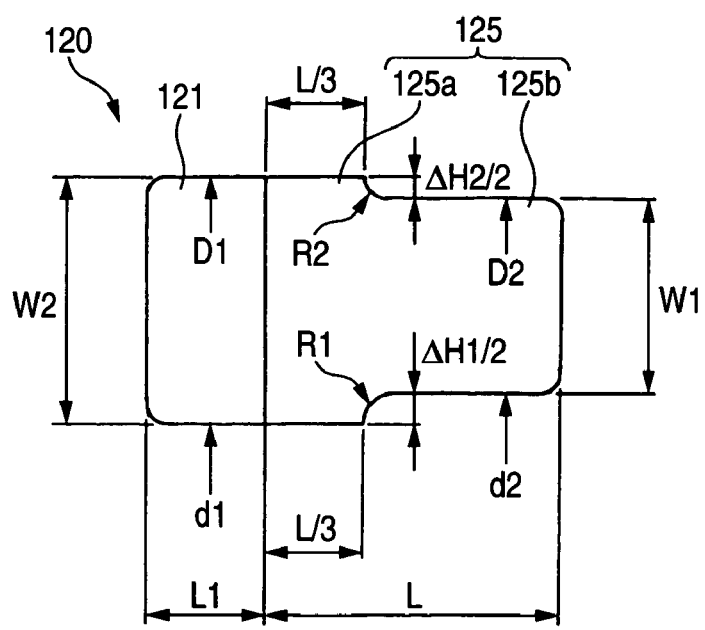
FIG. 12 is a view showing another comparative example.

FIG. 12 shows a further example (Comparative Example 3) of a synthetic resin cage which is out of the present invention. In this cage 120, each columnar portion 125 includes a base portion 125a having an inner diameter and an outer diameter as large as the inner diameter d1 and the outer diameter D1 of an annular portion 121 respectively, and a front end portion 125b having an inner diameter d2 larger than the inner diameter d1 of the annular portion 121 and an outer diameter D2 smaller than the outer diameter D1 of the annular portion 121. The axial dimension of the base portion 125a is set to be ⅓ of the whole length L of the columnar portion 125. The inner diameter surface of the annular portion 121 is flush with the inner diameter surface of the base portion 125a. The connecting portion between the inner diameter surface of the base portion 125a and the inner diameter surface of the front end portion 125b is rounded with a radius R1. The outer diameter surface of the annular portion 121 is flush with the outer diameter surface of the base portion 125a. The connecting portion between the outer diameter surface of the base portion 125a and the outer diameter surface of the front end portion 125b is rounded with a radius R2.

Using a finite element method (FEM), stress analysis and displacement analysis were performed on the aforementioned synthetic resin cages.

Figure 13:
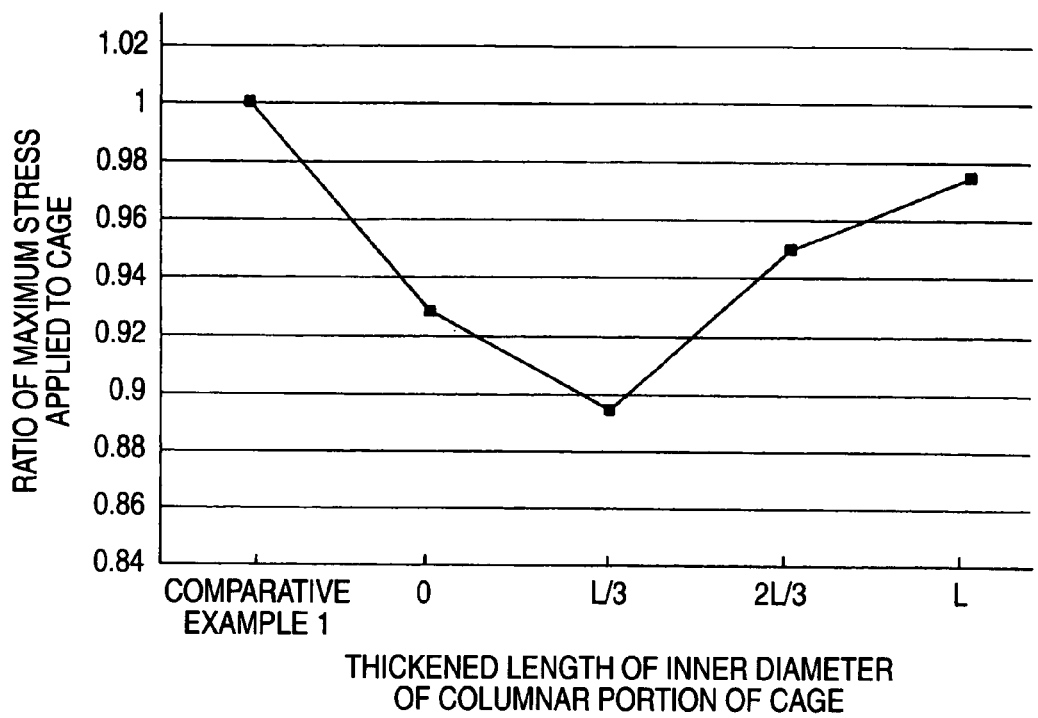
FIGS. 13 to 17 are graphs for explaining the effects of the embodiments.

First, FIG. 13 shows a result obtained by analysis of maximum stress applied to each cage due to centrifugal force on the assumption that each bearing rotated at 1,500,000 dmN, which analysis was performed on the first to third embodiments and Comparative Example 1. In comparison with Comparative Example 1, the maximum stress could be lowered conspicuously in the first embodiment (the inner-diameter thickened length of the columnar portion of the cage is (⅓)L). In addition, the maximum stress could be lowered in the second embodiment (the inner-diameter thickened length of the columnar portion of the cage is 0) and the third embodiment (the inner-diameter thickened length of the columnar portion of the cage is (⅔)L) the second and third most conspicuously next to the first embodiment in that order. The inclination of the straight line connecting the calculated value of the first embodiment with the calculated value of the third embodiment is larger than the inclination of the straight line connecting the calculated value of the first embodiment with the calculated value of the second embodiment, It is proved from FIG. 13 that the maximum stress increases when the inner-diameter thickened length (base portion length) of the columnar portion of the cage exceeds (⅔)L.

Figure 14:
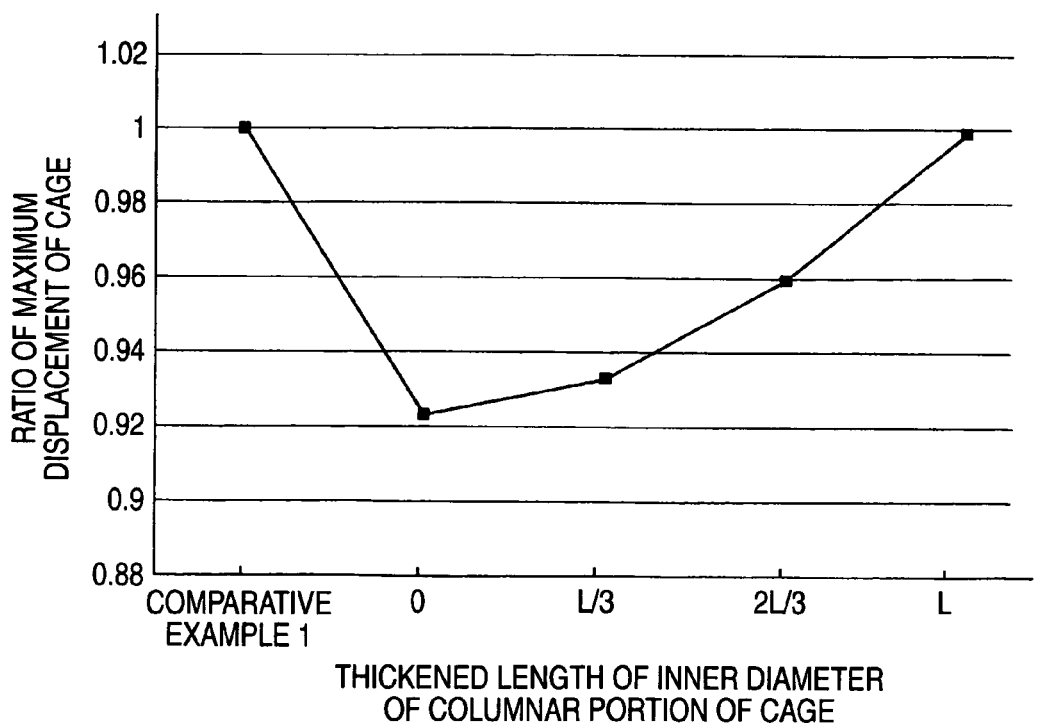

Next, FIG. 14 shows a result obtained by analysis of maximum displacement of each columnar portion of each cage due to centrifugal force on the assumption that each bearing rotated at 1,500,000 dmN, which analysis was performed on the first to third embodiments and Comparative Example 1. In comparison with Comparative Example 1, the maximum displacement could be lowered conspicuously in the second embodiment (the inner-diameter thickened length of the columnar portion of the cage is 0). In addition, the maximum displacement could be lowered in the first embodiment (the inner-diameter thickened length of the columnar portion of the cage is (⅓)L) and the third embodiment (the inner-diameter thickened length of the columnar portion of the cage is (⅔)L) the second and third most conspicuously next to the first embodiment in that order. The inclination of the straight line connecting the calculated value of the first embodiment with the calculated value of the third embodiment is larger than the inclination of the straight line connecting the calculated value of the first embodiment with the calculated value of the second embodiment.

It is proved from FIG. 14 that the maximum displacement increases when the inner-diameter thickened length (base portion length) of the columnar portion of the cage exceeds (⅔)L.

Figure 15:
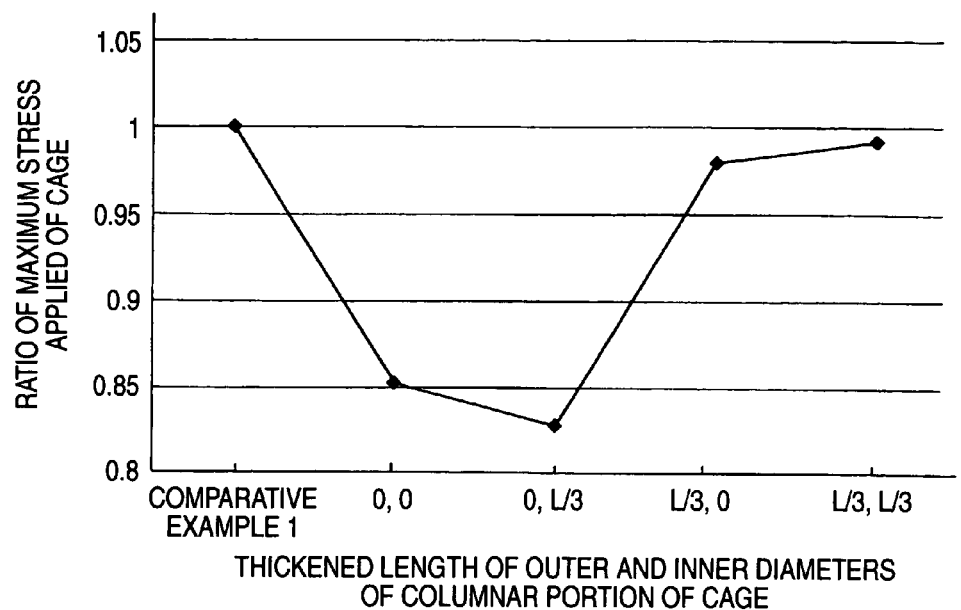

Next, FIG. 15 shows a result obtained by analysis of maximum stress applied to each cage due to centrifugal force on the assumption that each bearing rotated at 1,500,000 dmN, which analysis was performed on the fourth and fifth embodiments and Comparative Examples 1 to 3. In comparison with Comparative Example 1, the maximum stress could be lowered conspicuously in the fourth embodiment (the outer-diameter thickened length of the columnar portion of the cage is 0, and the inner-diameter thickened length thereof is (⅓)L). In addition, the maximum stress could be lowered in the fifth embodiment (the outer-diameter thickened length of the columnar portion of the cage is 0, and the inner-diameter thickened length thereof is 0) the second most conspicuously next to the fourth embodiment.

The maximum stress increased in Comparative Example 3 (the outer-diameter thickened length of the columnar portion of the cage is (⅓)L, and the inner-diameter thickened length thereof is 0) and Comparative Example 4 (the outer-diameter thickened length of the columnar portion of the cage is (⅓)L, and the inner-diameter thickened length thereof is (⅓)L).

Figure 16:
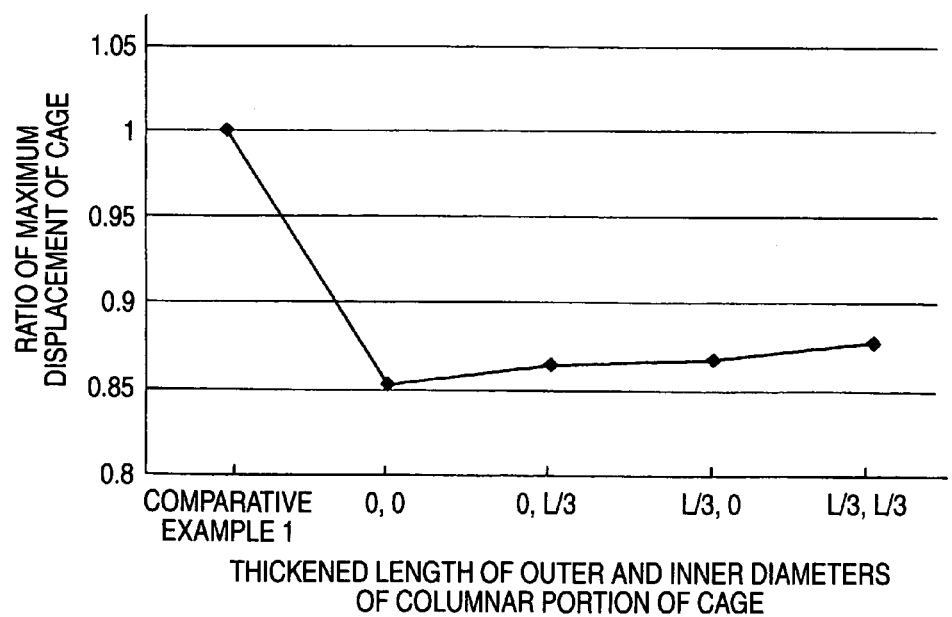

Next, FIG. 16 shows a result obtained by analysis of maximum displacement of each columnar portion of each cage due to centrifugal force on the assumption that each bearing rotated at 1,500,000 dmN, which analysis was performed on the fourth and fifth embodiments and Comparative Examples 1 to 3. In comparison with Comparative Example 1, the maximum displacement could be lowered conspicuously in the fifth embodiment (the outer-diameter thickened length of the columnar portion of the cage is 0, and the inner-diameter thickened length thereof is 0). In addition, the maximum displacement could be lowered in the fourth embodiment (the outer-diameter thickened length of the columnar portion of the cage is 0, and the inner-diameter thickened length thereof is (⅓)L) the second most conspicuously next to the fifth embodiment.

Figure 17:
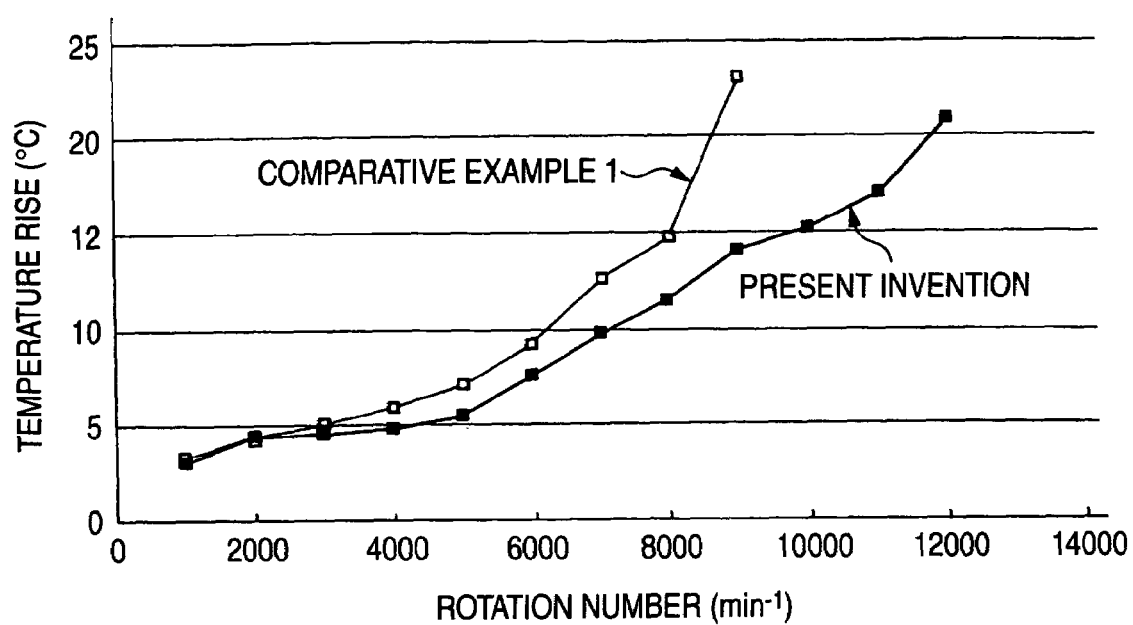

Next, a double row cylindrical roller bearing (see FIG. 7) in which the synthetic resin cages according to the fourth embodiment were incorporated and a cylindrical roller bearing in which the synthetic resin cages according to Comparative Example 1 were incorporated were prepared, and temperature rises in the both were compared using a horizontal testing machine. In the both, the inner diameter was set at 95 mm, the initial radial clearance was set at 0 µm, and lubricating was achieved with grease (NBU15). FIG. 17 shows a result thereof.

It is proved from FIG. 17 that the heat generation of the bearing during high speed rotation can be suppressed conspicuously according to the aforementioned present invention.

Figure 18:
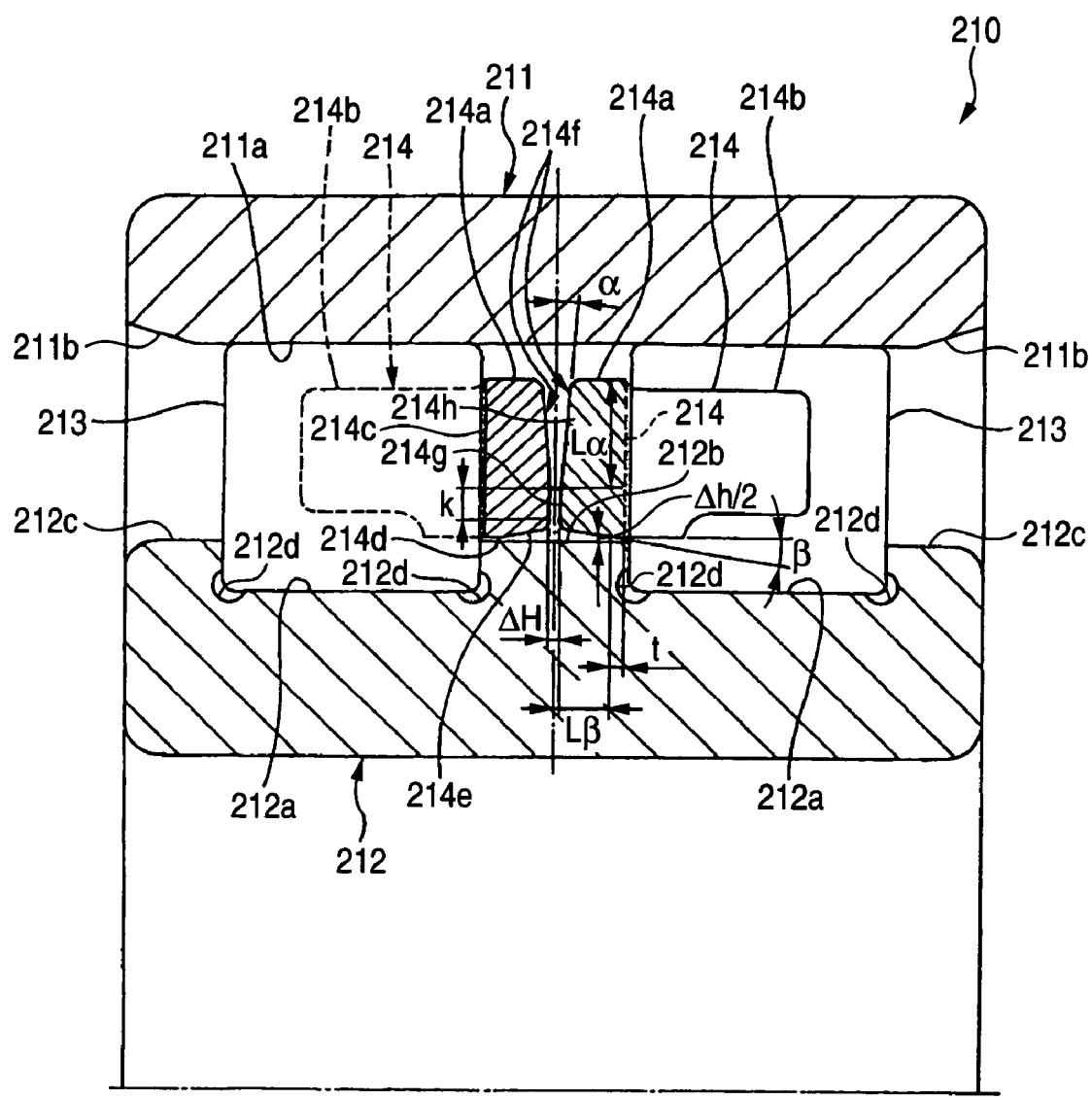
FIG. 18 is a main portion longitudinal sectional view showing inner ring guide type cages of a double row cylindrical roller bearing according to a sixth embodiment of the present invention.

As shown in FIG. 18, a double row cylindrical roller bearing 210 according to a sixth embodiment of the present invention is constituted by an outer ring 211 having an outer raceway surface 211a formed in its inner diameter portion, an inner ring 212 having two rows of inner raceway surfaces 212a formed in its outer diameter portion, a plurality of cylindrical rollers 213 inserted between the outer raceway surface 211a and each inner raceway surface 212a so as to roll desirably therebetween, and inner ring riding cages 214 for retaining the cylindrical rollers 213 rotatably in pocket portions and disposing the cylindrical rollers 213 at a predetermined circumferential interval.

The outer ring 211 has relieved profile portions 211b formed in the opposite ends of its inner diameter portion. The width of the outer raceway surface 211a excluding the relieved profile portions 211b is set to be two or more times as large as the sum of the width of the cylindrical roller 213 and the width of an annular portion 214a (which will be described later in detail) of the cage 214.

The inner ring 212 has annular rib portions 212c formed in its opposite ends, and an annular protrusion 212b formed substantially at its axial center. The two rows of inner raceway surfaces 212a each having the same width as the cylindrical roller 213 are formed between the rib portions 212c and the protrusion 212b respectively.

An annular undercut portion 212d having a curved shape in section is worked in each corner portion among the rib portions 212c, the protrusion 212b and the inner race way surfaces 212a. Thus, stress concentration in the corner portion is avoided while the interference with each corner portion of each cylindrical roller 213 is prevented.

For example, the outer ring 211, the inner ring 212 and the cylindrical rollers 213 are formed out of carburized bearing steel such as SCM420 or the like or induction hardened steel such as SAE4150 or the like, subjected to heat treatment to thereby harden the surface thereof.

The cages 214 serve to retain the cylindrical rollers 213 at a predetermined circumferential interval and insert the cylindrical rollers 213 between the outer ring 211 and the inner ring 212 so that the cylindrical rollers 213 can roll therebetween. For example, the cages 214 are formed by injection molding out of thermoplastic resin such as polyamide resin, polyphenylene sulfide resin, polyacetal resin or the like as a base material, to which about 10-30 wt % of glass fiber is added for improving the strength.

In addition, in each cage 214, an annular portion 214a molded like a ring is formed integrally with a plurality of cantilever-like columnar portions 214b provided to project axially from the annular portion 214a. The circumferential side surface shape of each columnar portion 214b is formed into a concave surface in which the diametral outside thereof has a curvature radius a little larger than the radius of the cylindrical roller 213, while the diametral inside thereof is formed into a flat surface connected smoothly to the concave surface.

Each cylindrical roller 213 is stored and retained rotatably in each pocket portion formed to be surrounded in its three sides by the circumferential opposite side surfaces of adjacent ones of the columnar portions 214b and an inner side surface 214c of the annular portion 214a.

Each cage 214 shown in FIG. 18 is an inner ring riding cage 214. The inner diameter dimension of the inner diameter portion of the annular portion 214a is set to be a little larger than the outer diameter dimension of the protrusion 212b of the inner ring 212. Thus, the inner diameter portion is guided by the protrusion 212b so that the radial position thereof is limited.

The inner diameter portion of the annular portion 214a is formed as a tapered hole in which a straight portion 214d having a comparative short length t is provided on the inner side surface 214c side, and a tapered portion 214e having a length Lβ longer than the length t of the straight portion 214d is formed continuously to the straight portion 214d.

The tapered portion 214e is formed as a tapered hole whose inner diameter dimension increases gradually as it goes from the inner side surface 214c of the annular portion 214a to an outer side surface 214f thereof. The inclination angle β is set at an optimum angle in a range of from 1° to 10° in accordance with the use conditions (chiefly rotational speed) of the double row cylindrical roller bearing 210.

In the outer side surface 214f of the annular portion 214a, a straight portion 214g having a comparatively short length k is formed on the inner diameter side, and a tapered portion 214h having a longer length Lα than the straight portion 214g is formed continuously on the outer diameter side.

The tapered portion 214h is inclined so that the axial dimension of the annular portion 214a is reduced gradually as it goes from the inner diameter side of the annular portion 214a to the outer diameter side thereof. The inclination angle α is set at an optimum angle in a range of from 1° to 10° in accordance with the use conditions (chiefly rotational speed) of the double row cylindrical roller bearing 210.

Next, a double row cylindrical roller bearing according to a seventh embodiment of the present invention will be described with reference to FIG. 20.

Figure 20:
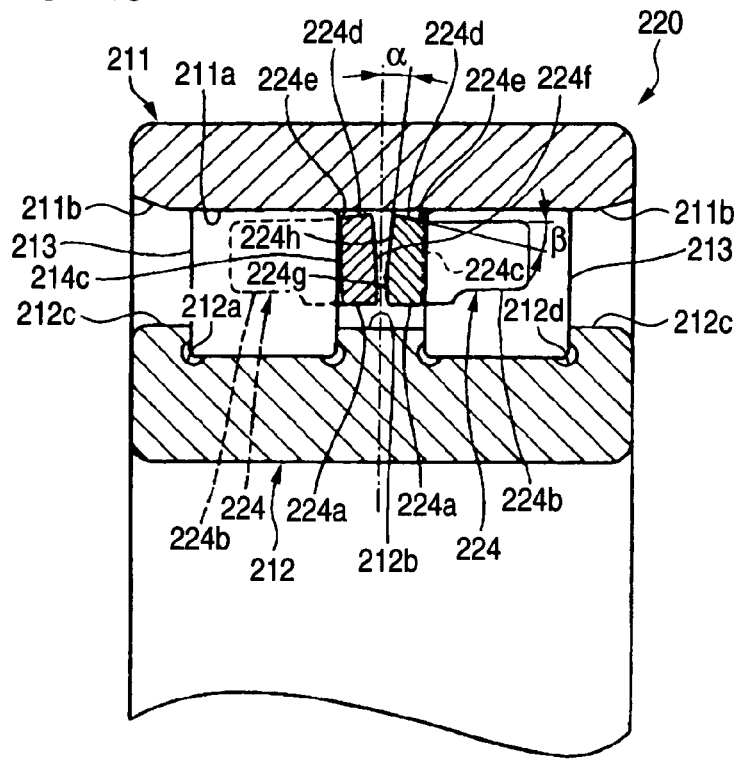
FIG. 20 is a main portion longitudinal sectional view showing outer ring guide type cages of a double row cylindrical roller bearing according to a seventh embodiment of the present invention.

As shown in FIG. 20, outer ring guide type cages 224 are incorporated in a double row cylindrical roller bearing 220 according to a seventh embodiment of the present invention.

In each cage 224, an annular portion 224a molded like a ring is formed integrally with a plurality of cantilever-like columnar portions 224b provided to project axially from the annular portion 224a.

The circumferential side surface shape of each columnar portion 224b is formed into a concave surface in which the diametral outside thereof has a curvature radius a little larger than the radius of the cylindrical roller 213, while the diametral inside thereof is formed into a flat surface connected smoothly to the concave surface. In addition, each cylindrical roller 213 is retained rotatably in each pocket portion formed to be surrounded in its three sides by the circumferential opposite side surfaces of adjacent ones of the columnar portions 224b and an inner side surface 214c of the annular portion 224a.

The outer diameter portion of the annular portion 224a is formed as a tapered shape in which a straight portion 224d having a comparative short length is provided on the outer side surface 224f side, and a tapered portion 224e having a longer length than the straight portion 224d is formed continuously to the straight portion 224d.

The outer diameter dimension of the straight portion 224d is set to be a little smaller than the inner diameter dimension of the outer ring 211, Thus, the outer diameter portion is guided by the inner diameter portion of the outer ring 211 so that the radial position of the outer ring guide type cage 224 is limited.

The tapered portion 224e is formed so that the inner diameter dimension is reduced gradually as it goes from the outer side surface 224f of the annular portion 224a to the inner side surface 224c thereof. The inclination angle β is set at an arbitrary angle in a range of from 1° to 10° in accordance with the use conditions of the double row cylindrical roller bearing 220.

In the outer side surface 224f of the annular portion 224a, a straight portion 224g having a comparatively short length is formed on the inner diameter side, and a tapered portion 224h longer than the straight portion 224g is formed continuously on the outer diameter side.

The tapered portion 224h is inclined so that the axial dimension of the annular portion 224a is reduced gradually as it goes from the inner diameter side of the annular portion 224a to the outer diameter side thereof. The inclination angle α is set in a range of from 1° to 10° in accordance with the use conditions of the double row cylindrical roller bearing 220.

Incidentally, the other parts are similar to those of the inner ring riding cage 214 according to the aforementioned sixth embodiment. Therefore, parts the same as those of the inner ring riding cage 214 in the sixth embodiment are denoted by the same reference numerals correspondingly, and description thereof will be omitted.

Next, a double row cylindrical roller bearing according to an eighth embodiment of the present invention will be described with reference to FIG. 21.

Figure 21:
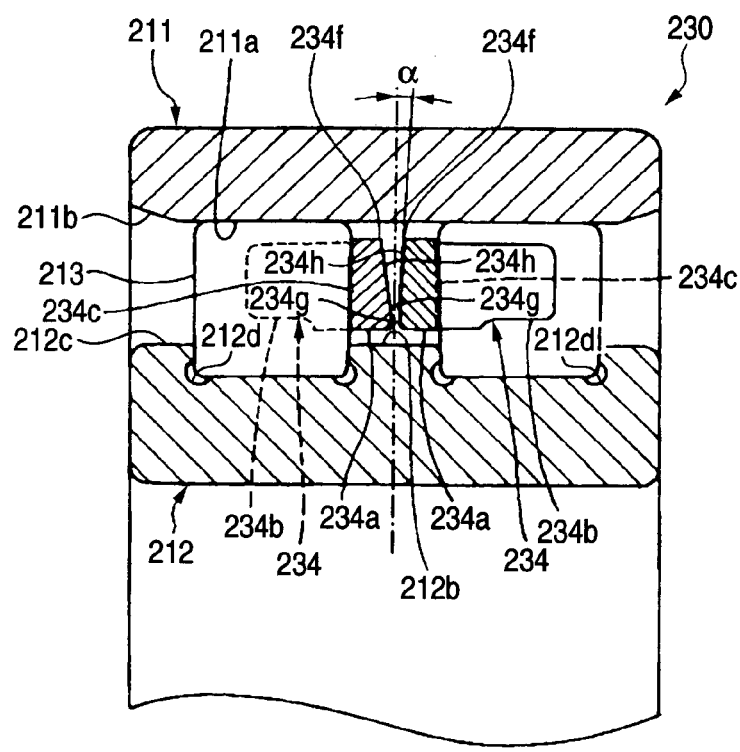
FIG. 21 is a main portion longitudinal sectional view showing roller guide type cages of a double row cylindrical roller bearing according to an eighth embodiment of the present invention.

As shown in FIG. 21, roller riding cages 234 are incorporated in a double row cylindrical roller bearing 230 according to the eighth embodiment of the present invention.

In each cage 234, an annular portion 234a molded like a ring is formed out of synthetic resin integrally with a plurality of cantilever-like columnar portions 234b provided to project axially from the annular portion 234a. Each cylindrical roller 213 is stored and retained rotatably in each pocket portion formed to be surrounded in its three sides by the circumferential opposite side surfaces of adjacent ones of the columnar portions 234b and an inner side surface 234c of the annular portion 234a. Thus, the radial position of the roller guide type cage 234 is limited by the cylindrical rollers 213.

The outer diameter portion of the annular portion 234a is formed to have a diameter smaller than the inner diameter of the outer ring 211, while the inner diameter portion of the annular portion 234a is formed to have a diameter larger than the outer diameter of the protrusion 212b of the inner ring 212. Thus, appropriate clearances are provided between of the outer diameter portion of the annular portion 234a and the outer ring 211 and between the inner diameter portion of the annular portion 234a and the inner ring 212 respectively, In an outer side surface 234f of the annular portion 224a, a straight portion 234g having a comparatively short length is formed on the inner diameter side, and a tapered portion 234h longer than the straight portion 234g is formed continuously on the outer diameter side.

The tapered portion 234h is inclined so that the axial dimension of the annular portion 234a is reduced gradually as it goes from the inner diameter side of the annular portion 234a to the outer diameter side thereof. The inclination angle α is set in a range of from 1° to 10° in accordance with the use conditions of the double row cylindrical roller bearing 230.

Incidentally, the other parts are similar to those of the inner ring riding cage 214 according to the aforementioned sixth embodiment. Therefore, parts the same as those of the inner ring riding cage 214 in the sixth embodiment are denoted by the same reference numerals correspondingly, and description thereof will be omitted.

The operations of the double row cylindrical roller bearings according to the aforementioned sixth to eighth embodiments will be described.

Figure 19:
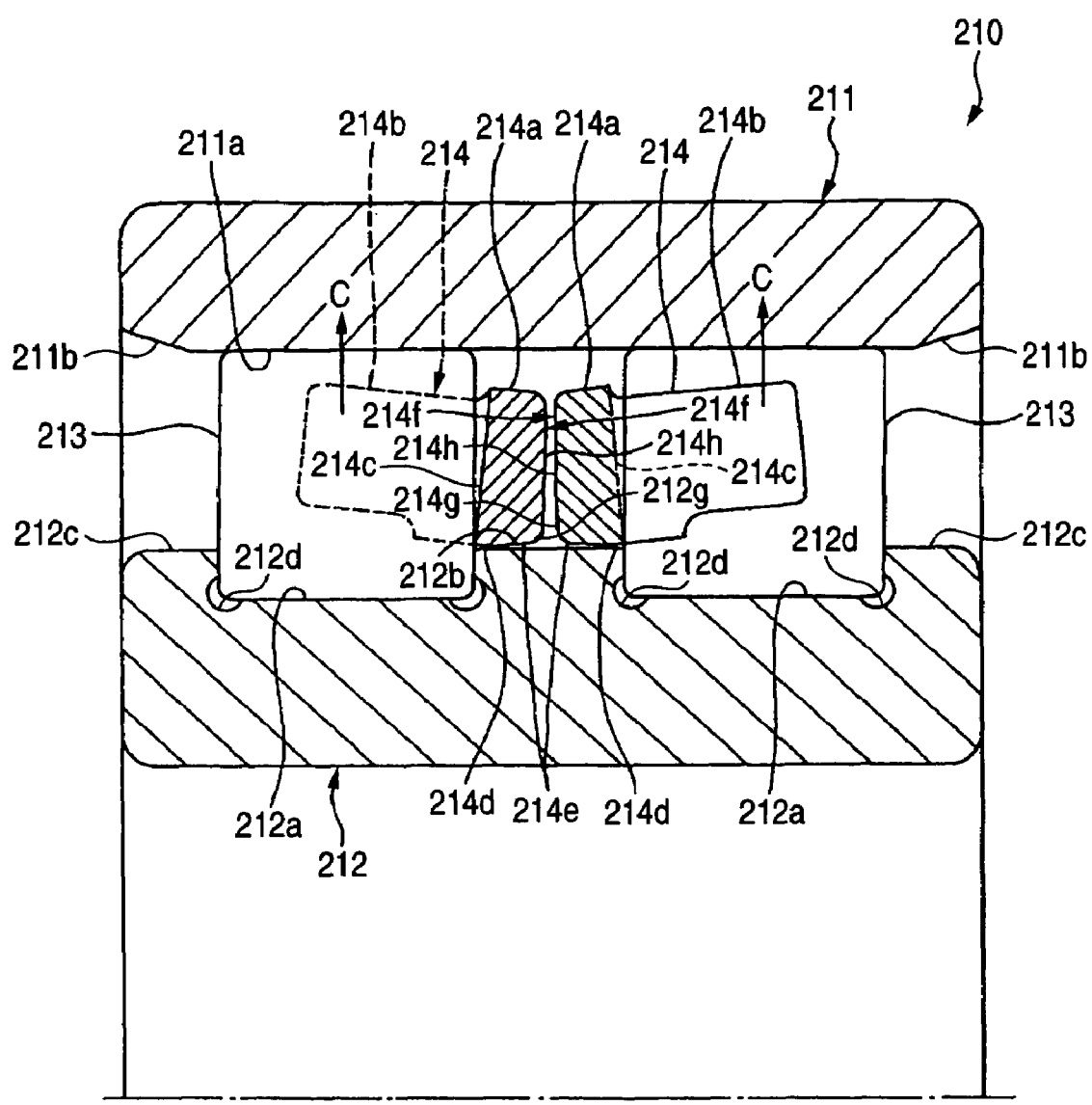
FIG. 19 is a main portion longitudinal sectional view showing the state of the inner ring guide type cages elastically deformed due to centrifugal force in FIG. 18.

As shown in FIG. 19, when the double row cylindrical roller bearing 210 in which the inner ring riding cages 214 made from synthetic resin according to the sixth embodiment have been incorporated is rotated at a high speed, a centrifugal force proportional to the square of the rotational speed acts on each cage 214 in the arrow C direction (outward in the radial direction).

For this reason, each cantilever-like columnar portion 214b is displaced at its front end in the arrow C direction. With this displacement, a torsional force acts on each annular portion 214a so that the annular portion 214a is elastically deformed. That is, the outer diameter side of the annular portion 214a is deformed toward the outer side surface 214f, while the inner diameter side thereof is deformed toward the inner side surface:214c.

Due to the aforementioned elastic deformation, the cages 214 opposed to each other back to back on the outer side surfaces 214f of the annular portions 214a are displaced in directions in which the outer-diameter-side outer side surfaces-214f approach each other.

However, in each outer side surface 214f, the tapered portion 214h inclined at the inclination angle α such that the axial dimension of the annular portion 214a is reduced gradually as it goes from the inner diameter side of the annular portion 214a to the outer diameter side thereof is formed. Therefore, the outer side surfaces 214f are merely deformed elastically till the tapered portions 214h are substantially parallel with each other, but there is no fear that the outer side surfaces 214f interfere with each other.

In addition, the inner diameter portion on the outer side surface 214f side of each annular portion 214a is displaced to approach the protrusion 212b of the inner ring 212. However, the inner diameter portion is formed as a tapered hole with the inclination angle β such that the inner diameter dimension increases gradually as it goes from the inner side surface 214c of the annular portion 214a to the outer side surface 214f thereof. Therefore, the inner diameter portions are merely deformed elastically till the tapered portions 214e are substantially parallel with the protrusion 212b of the inner ring 212, but there is no fear that the inner diameter portions interfere with the protrusion 212b.

Accordingly, heat generation or torque fluctuation caused by interference of members with each other or local abrasion of interference portions is prevented, while deterioration of lubricant due to heat is prevented. Thus, it is possible to obtain a long-life double row cylindrical roller bearing which can be rotated continuously at a high-speed not lower than 1,000,000 dmN with a very small amount of lubricant.

Excessive increase of the inclination angle a of the outer side surface 214f and the inclination angle β of the inner diameter portion advantageously permits prevention of interference, but the strength of the annular portion 214e is reduced. Thus, optimum angles have to be selected as the inclination angles α and β in accordance with the service rotation number of the double row cylindrical roller bearing 210.

Based on many experiments, the present inventor discovered that it was ideal to set each inclination angle α; β at an angle not smaller than 1° in view of formation tolerance and not larger than 10° in view of strength.

Since the straight portion 214g having a length k is formed in each outer side surface 214f, an axial clearance ΔH is secured between the two cages 214 even when the double row cylindrical roller bearing 210 is rotating at a low speed or stopping. Thus, the postures of the cages 214 are stable.

In addition, since the straight portion 214d having a length t is formed in each inner diameter portion, each cage 214 is guided by the protrusion 212b of the inner ring 212 so as to be positioned in a stable posture in the double row cylindrical roller bearing 210.

Incidentally, when the clearance between the inner diameter portion of each cage 214 and the protrusion 212b of the inner ring 212 is Δh/2, it is preferable that the length k of the straight portion 214g is set to satisfy Δh<k<Lα.

The reason why k is made larger than Δh is to secure an enough length necessary for stable control of the clearance ΔH between the cages 214. The reason why k is made smaller than Lα is to secure a wider tapered surface to bring out the effect of the present invention to the utmost.

In addition, when the axial clearance between the cages 214 is ΔH, it is preferable that the length t of the straight portion 214d in each inner diameter portion is set to satisfy ΔH<t<Lβ.

The reason why t is made larger than ΔH is to secure an enough length necessary for stable control of the clearance Δh/2 between the inner ring 212 and each cage 214. The reason why t is made smaller than Lβ is to secure a wider tapered surface to bring out the effect of the present invention to the utmost.

As shown in FIG. 20, when the double row cylindrical roller bearing 220 in which the outer ring riding cages 224 according to the seventh embodiment of the present invention have been incorporated is rotated at a high speed, the annular portions 224a are distorted due to centrifugal force so that the cages 224 are elastically deformed in the same manner as in the aforementioned inner ring riding cages 214 according to the sixth embodiment.

However, in each outer side surface 224f, the tapered portion 224h is formed so that the axial dimension of the annular portion 224a is reduced gradually as it goes from the inner diameter side of the annular portion 224a to the outer diameter side thereof. Therefore, the outer side surfaces 224f are merely deformed elastically till the tapered portions 224h are substantially parallel with each other, but there is no fear that the outer side surfaces 224f interfere with each other.

In addition, the outer diameter portion of each annular portion 224a is formed into a tapered shape such that the outer diameter dimension is reduced gradually as it goes from the outer side surface 224f of the annular portion 224a to the inner side surface 224c thereof. Therefore, the outer diameter portions are merely deformed elastically till the tapered portions 224e are substantially parallel with the outer raceway surface 211a of the outer ring 211, but there is no fear that the outer diameter portions interfere with the outer raceway surface 211a.

Accordingly, in the same manner as in the inner ring riding cages 214 according to the sixth embodiment, heat generation and torque fluctuation are reduced, while local abrasion is prevented. Thus, it is possible to increase the life of the double row cylindrical roller bearing.

As shown in FIG. 21, when the double row cylindrical roller bearing 230 in which the roller riding cages 234 according to the eighth embodiment of the present invention have been incorporated is rotated at a high speed, the annular portions 234a of the cages 234 are distorted due to centrifugal force so that the cages 234 are elastically deformed.

However, in each outer side surface 234f, the tapered portion 234h is formed so that the axial dimension of the annular portion 234a is reduced gradually as it goes from the inner diameter side of the annular portion 234a to the outer diameter side thereof. Therefore, the outer side surfaces 234f are merely deformed elastically till the tapered portions 234h are substantially parallel with each other, but there is no fear that the outer side surfaces 234f interfere with each other.

In addition, the outer diameter portion and the inner diameter portion of each annular portion 234a are provided with appropriate clearances with the outer ring 211 and the inner ring 212 respectively. Thus, even when the outer and inner diameter portions are elastically deformed, there is no fear that they interfere with any ring. Accordingly, heat generation and torque fluctuation due to interference of parts with each other can be reduced, while local abrasion can be prevented.

Description will be made about examples concerning the double row cylindrical roller bearings according to the sixth to eighth embodiments of the present invention described above, and comparative examples for making comparison with those examples. That is, description will be made about testing on Example 1, Example 2, Example 3 and Example 4 for confirming the effects of the cages to be incorporated in the double row cylindrical roller bearings according to the present invention, and testing on Comparative Example 5 for making comparison with the examples.

For the testing, three kinds of inner ring riding cages in which each inclination angle α, β was set at 0°, 2.9° and 10° respectively, and an inner ring riding cage in which the inclination angle α was set at 2.9° and the inclination angle β was set at 10° were formed out of synthetic resin, and double row cylindrical roller bearings in which those cages were incorporated respectively were used as specimens.

In addition, evaluation was determined in accordance with an ultimate dmN value (pitch circle diameter×rotation number) when the double row cylindrical roller bearing in question was rotated, and the existence of occurrence of abnormality.

Table 1 shows the test results.

TABLE 1

|  | ΔH/Hc | ultimate dmN (pitch circle diameter × rotation number) | outer side surface inclination angle α | inner diameter inclination angle β | result |
| --- | --- | --- | --- | --- | --- |
| Example 1 | 0.0275 | 1,440,000 | 2.9 | 2.9 | normal |
| Example 2 | 0.0183 | 1,440,000 | 2.9 | 10.0 | normal |
| Example 3 | 0.0367 | 1,440,000 | 2.9 | 2.9 | normal |
| Example 4 | 0.0321 | 1,440,000 | 10.0 | 10.0 | normal |

TABLE 1-continued

| | ΔH/Hc | ultimate dmN (pitch circle diameter × rotation number) | outer side surface inclination angle α | inner diameter inclination angle β | result |
|---|---|---|---|---|---|
| Comparative Example 5 | 0.0275 | 970,000 | 0 | 0 | abnormal temperature rise guide surface abrasion cage pocket end surface abrasion cage outer side surface abrasion |

ΔH designates axial clearance of bearing cage and Hc designates width of bearing cage.

In the testing on Examples 1 to 4 where an inclination angle of 2.9° or 10° was provided in the outer side surface and an inclination of 2.9° or 10° was provided in the inner diameter portion, the dmN value (pitch circle diameter×rotation number) reached 1,440,000, but no abnormality was recognized under any condition.

On the other hand, in Comparative Example 5 where no inclination angle was provided in either the outer side surface or the inner diameter portion, the double row cylindrical roller bearing reached an abnormally high temperature when the dmN value reached 970,000 or more.

In addition, the internal conditions of the disassembled bearing were checked after the termination of the testing. As a result, conspicuous abrasion was found in the pocket side surface and the outer side surface of each cage, and abrasion was confirmed also in the guide surface of the inner ring.

From the above test results, it was proved that the double row cylindrical roller bearings according to the present invention were extremely effective against abrasion and heat generation.

Figure 22:
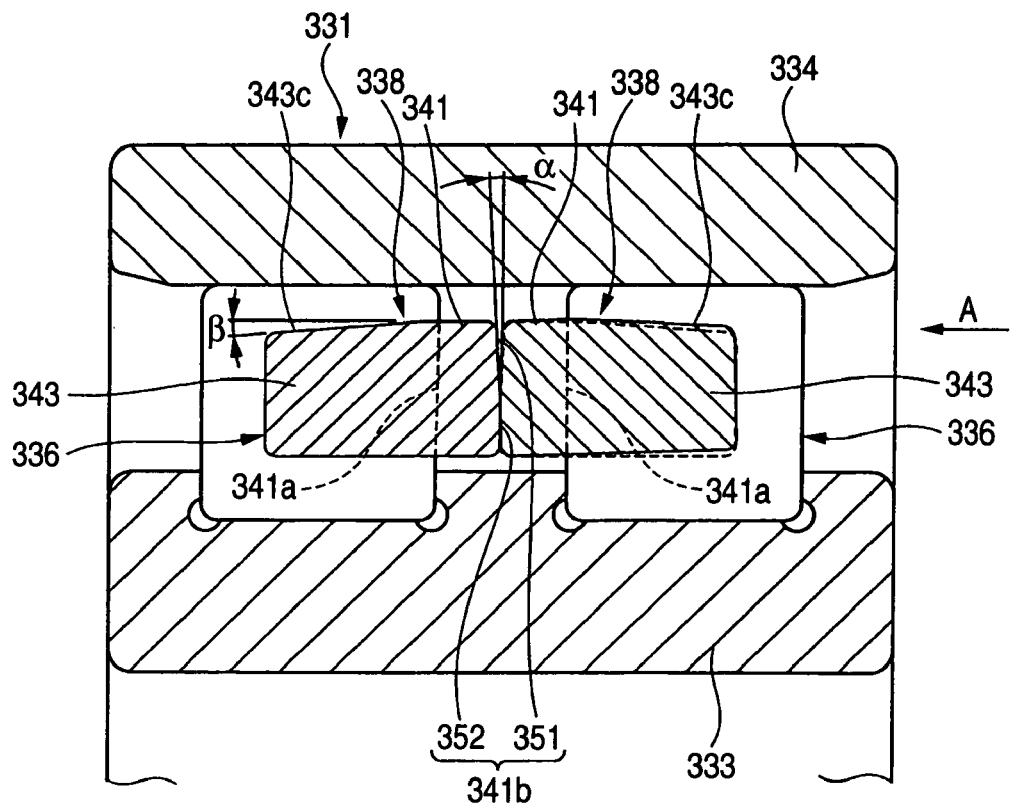
FIG. 22 is a longitudinal sectional view of a double row cylindrical roller bearing according to a ninth embodiment of the present invention.

As shown in FIG. 22, in a double row cylindrical roller bearing 331 according to a ninth embodiment of the present invention, two rows of cylindrical rollers 336 are arrayed between an inner ring 333 and an outer ring 334, while a synthetic resin cage 338 for retaining the intervals between the cylindrical rollers 336 in the circumferential direction of the bearing is fitted for each roller row.

The aforementioned synthetic resin cage 338 includes an annular portion 341 disposed on the inner end side of the cylindrical rollers 336 in each roller row coaxially therewith, and a plurality of columnar portions 343 projecting axially from the roller-side end surface of the annular portion 341.

Figure 23:
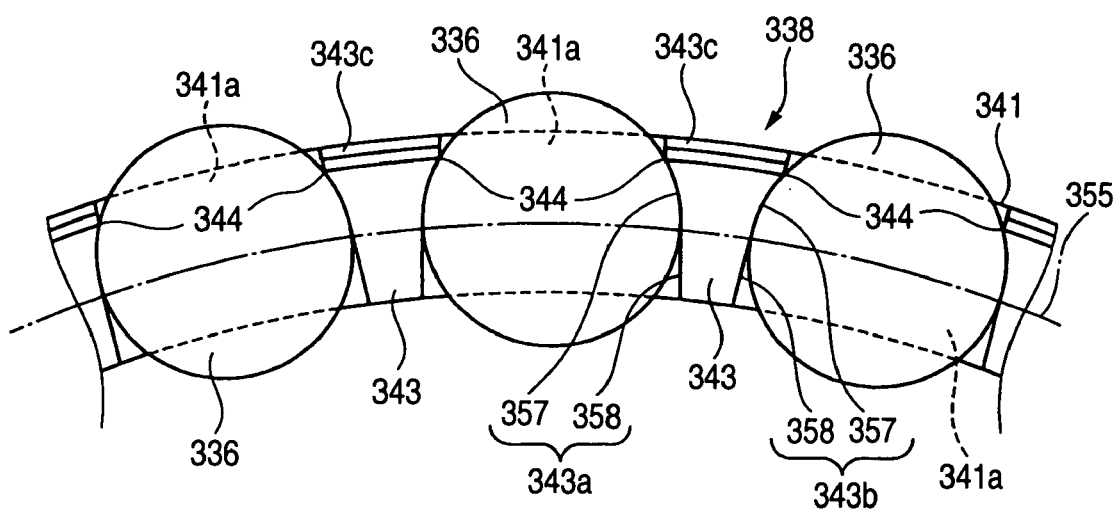
FIG. 23 is a side view from arrow A in FIG. 22.

Each columnar portion 343 has a so-called cantilever-like shape whose front end is a free end. Pockets for retaining the intervals between the cylindrical rollers 336 on one and the same roller row are formed by bearing-circumferential opposite side surfaces 343a and 343b of the columnar portions 343 and the roller-side end surface 341a of the aforementioned annular portion 341 respectively as shown in FIG. 23.

Further, in each synthetic resin cage 338 according to this ninth embodiment, roller-propped portions 344 to be guided by the cylindrical rollers 336 in each roller row are provided in bearing-circumferential opposite side surfaces 343a and 343b of each columnar portion 343. Thus, the radial position of the cage itself is limited by the roller-propped portions 344 abutting against the cylindrical rollers 336.

In addition, an outer circumferential surface 343c of each columnar portion 343 in this ninth embodiment is formed into a tapered surface whose diameter is reduced gradually at an angle β as it approaches its axially front end. Thus, a part of the columnar portion 343 is saved in weight so as to suppress the bending deformation in a direction to expand the diameter thereof due to centrifugal force.

Incidentally, as for the synthetic resin cage 338 located on the right side in FIG. 22, the solid line designates the state where the front end of each columnar portion 343 is bent in a direction to expand its diameter due to centrifugal force during relative rotation between the inner and outer rings 333 and 334. On the other hand, the two-dot chain line designates the normal posture having no bending during non-rotation.

In addition, in each back surface (opposite surface to the roller-side end surface 341a) 341b of the annular portions 341 opposed to each other between the inner and outer rings 333 and 334, a tapered surface 351 inclined at an angle α is formed on the outer diameter side β and α flat surface 352 perpendicular to the axis is formed on the inner diameter side.

The aforementioned tapered surface 351 prevents the free end side of the columnar portion 343 in each synthetic resin cage 338 from bending in a direction to expand its diameter due to centrifugal force to thereby cause unnecessary sliding friction due to axial thrust brought about between the outer diameter side of each annular portion 341 and each cylindrical roller 336 to be confronted with each other between the inner and outer rings 333 and 334. On the other hand, the aforementioned flat surface 352 serves as a reference surface to control a clearance between the synthetic resin cages 338 to be opposed to each other on their back surfaces 341b so as to secure a proper position.

Incidentally, it is preferable that the aforementioned angle α of the tapered surface 351 in the back surface 341b of the annular portion 341 or the aforementioned angle β of the outer circumferential surface 343c of the columnar portion 343 is in a range of from 1 degree to 10 degrees. That is, a taper having an angle smaller than 1 degree is apt to be affected by manufacturing errors such as deformation, remaining burrs or the like after molding due to molding strain. On the contrary, in a taper having an angle larger than 10 degrees, there is a fear that the columnar portion or the annular portion thins down to cause shortage of strength.

Further, the bearing-circumferential opposite side surfaces 343a and 343b of each columnar portion 343 in this ninth embodiment are designed as follows. That is, as shown in FIG. 23, the region on the outer diameter side of a pitch circle diameter 355 on which each cylindrical roller 336 should be disposed is formed as a circular arc surface 357 whose radius is 1.005-1.1 times as large as the radius of the cylindrical roller 336, while the region on the inner diameter side of the aforementioned pitch circle diameter 355 is formed as a straight surface 358 which will not allow contact pressure in the radial direction of the bearing to act on the cylindrical roller 336 in contact therewith.

That is, according to the synthetic resin cage 338 having the aforementioned configuration, the straight surfaces 358 formed in the aforementioned bearing-circumferential opposite side surfaces 343a and 343b respectively abut against the cylindrical roller 336 when the free end side of the aforementioned columnar portion 343 bends in a direction to expand its diameter due to centrifugal force. Thus, no pinching occurs between the aforementioned columnar portion 343 and the aforementioned cylindrical roller 336.

Thus, the double row cylindrical roller bearing 331 according to this ninth embodiment can prevent abnormal noise or fatigue from occurring due to the aforementioned pinching of the columnar portions 343. In addition, the double row cylindrical roller bearing 331 can suppress the lowering of rotating performance due to temperature rise or the like. Thus, it is possible to secure excellent low noise characteristic, high temperature stability, and durability.

Incidentally, the configuration of the aforementioned bearing-circumferential opposite side surfaces 343a and 343b is not limited to that of the aforementioned ninth embodiment, Various configurations can be adopted.

Figure 24:
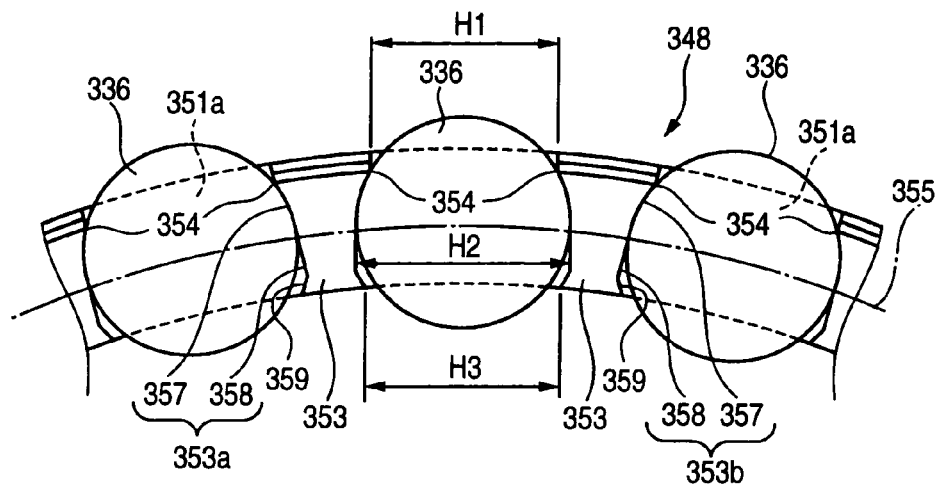
FIG. 24 is a partial front view of a synthetic resin cage in a double row cylindrical roller bearing according to a tenth embodiment of the present invention.

For example, each synthetic resin cage 348 of a double row cylindrical roller bearing according to a tenth embodiment of the present invention shown in FIG. 24 includes an annular portion 351 disposed on the inner end side of cylindrical rollers 336 in each roller row coaxially therewith, and a plurality of columnar portions 353 projecting axially from the roller-side end surface of the annular portion 351.

Each of these columnar portions 353 has a cantilever-like shape whose front end is a free end. Each pocket for retaining an interval between adjacent ones of the cylindrical rollers 336 on one and the same roller row is formed by the bearing-circumferential opposite side surfaces 353a and 353b of each columnar portion 353 and the roller-side end surface 351a of the aforementioned annular portion 351.

The hearing-circumferential opposite side surfaces 353a and 353b of each aforementioned columnar portion 353 are designed as follows. That is, the region on the outer diameter side of a pitch circle diameter 355 on which each cylindrical roller 336 should be disposed is formed as a circular arc surface 357, while the region on the inner diameter side of the aforementioned pitch circle diameter 355 is formed as a straight surface 358 which will not allow contact pressure in the radial direction of the bearing to act on the cylindrical roller 336 in contact therewith.

Further, an array of protrusions 359 are provided in the bearing-inner-diameter-side end portions of the bearing-circumferential opposite side surfaces 353a and 353b of each columnar portion 353 so as to satisfy H1<H3≦H2 when in the bearing-circumferential opposite side surfaces 353a and 353b of each aforementioned columnar portion 353, H1 designates the spacing distance between roller-propped portions 354 and 354 provided on the outer diameter side of each aforementioned columnar portion 353 and guided by the rollers, H2 designates the spacing distance between the aforementioned straight surfaces 358 and 358, and H3 designates the spacing distance between the bearing-inner-diameter-side end portions.

That is, lubricant such as grease or the like can be retained on the bearing-circumferential opposite side surfaces 353a and 353b due to the protrusion array 359 provided in the bearing-inner-diameter-side end portions of the bearing-circumferential opposite side surfaces 353a and 353b of each aforementioned columnar portion 353. Thus, temperature rise, occurrence of abnormal noise, lowering of rotating performance, and the like, due to shortage of lubricant can be prevented.

Thus, in spite of high speed rotation with lubrication with a very small amount of lubricant, excellent low noise characteristic can be secured, and high speed stability and durability can be further improved.

Figure 25:
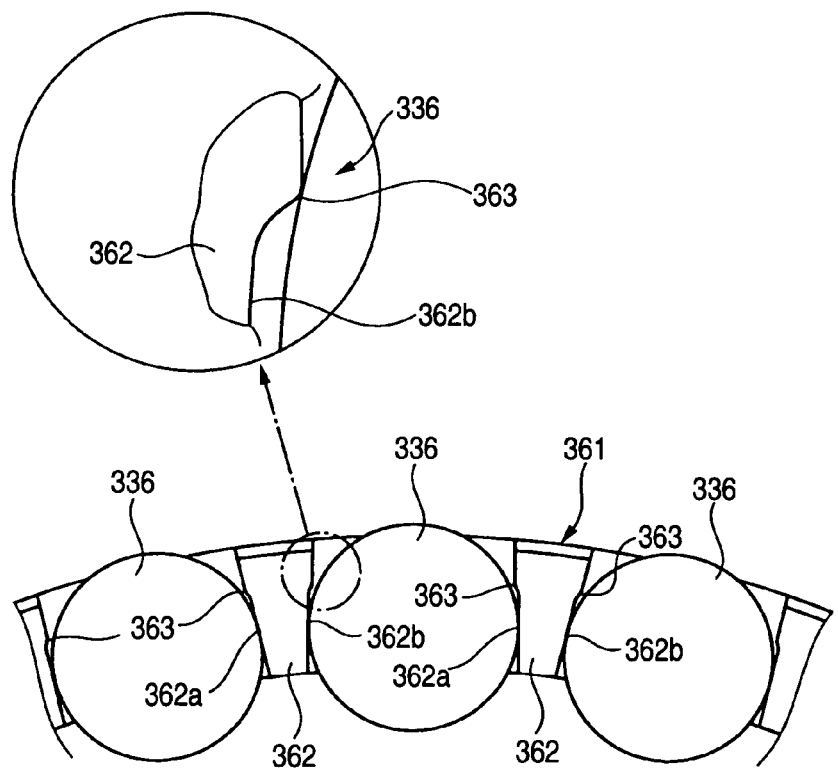
FIG. 25 is a partial front view of a synthetic resin cage in a double row cylindrical roller bearing according to an eleventh embodiment of the present invention.

In addition, each synthetic resin cage 361 of a double row cylindrical roller bearing according an eleventh embodiment of the present invention shown in FIG. 25 has a shape in which bearing-circumferential opposite side surfaces 362a and 362b of each columnar portion 362 are formed out of straight surfaces respectively, and each roller-propped portion 363 is light-chamfered.

Figure 26:
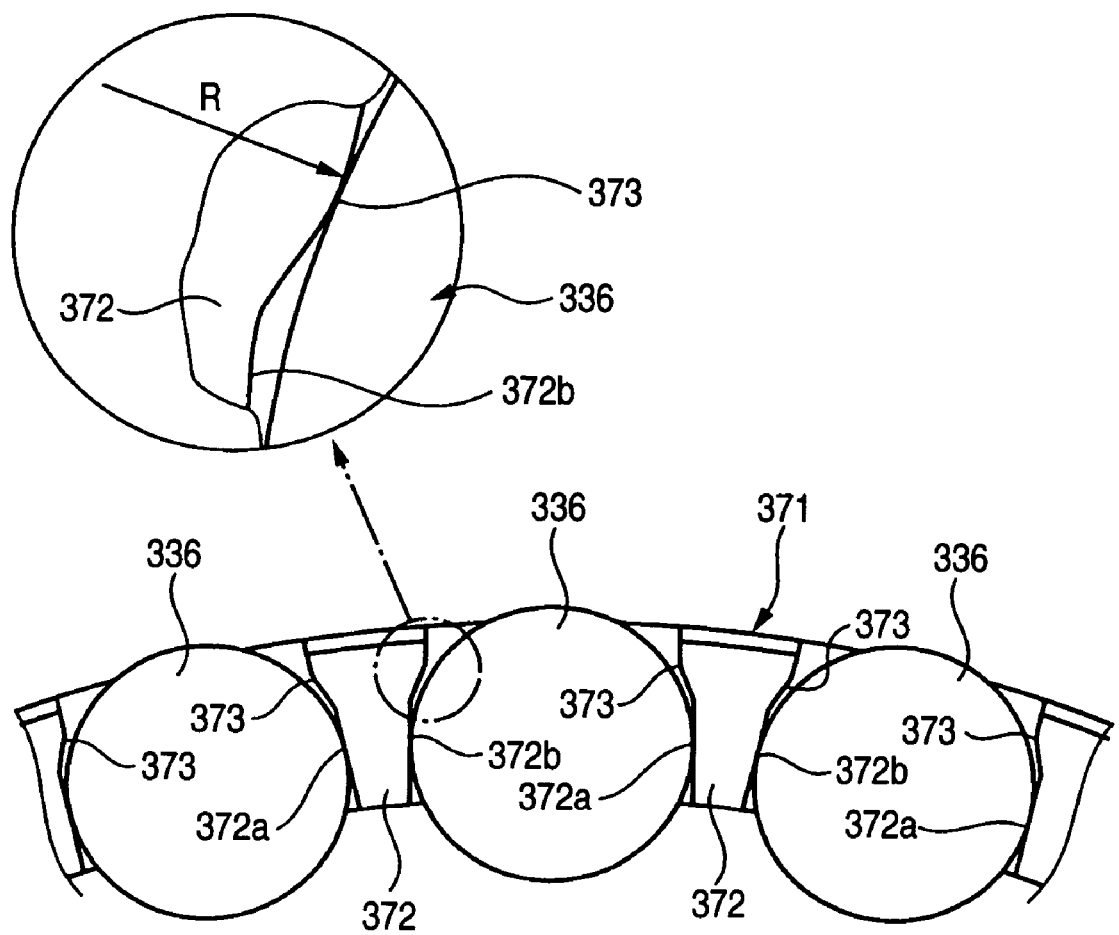
FIG. 26 is a partial front view of a synthetic resin cage in a double row cylindrical roller bearing according to a twelfth embodiment of the present invention.

Each synthetic resin cage 371 of a double row cylindrical roller bearing according a twelfth embodiment of the present invention shown in FIG. 26 is designed as follows. That is, bearing-circumferential opposite side surfaces 372a and 372b of each columnar portion 372 are formed out of straight surfaces respectively, and only each roller-propped portion 373 is formed into a circular arc surface having a radius R.

Each synthetic resin cage 381 of a double row cylindrical roller bearing according a thirteenth embodiment of the present invention shown in FIG. 27 has a configuration as follows. That is, in bearing-circumferential opposite side surfaces 382a and 382b of each columnar portion 382, the region on the outer diameter side of a pitch circle diameter on which each cylindrical roller 336 should be disposed is formed as a circular arc surface 384 having a radius R2, while the region on the inner diameter side of the aforementioned pitch circle diameter is formed as a straight surface 385. In addition, each roller-propped portion 383 is formed into a circular arc surface having a radius R. Incidentally, the radius R2 of the aforementioned circular arc surface 384 is formed to be about 1,005-1.1 times as large as the radius of the cylindrical roller 336.

That is, also by any one of the synthetic resin cages 361, 371 and 381 according to the aforementioned eleventh to thirteenth embodiments, no pinching occurs between each columnar portion and each cylindrical roller in the same manner as in the synthetic resin cage 338 according to the aforementioned ninth embodiment. Thus, abnormal noise or fatigue can be prevented from occurring due to pinching of each columnar.

Further, in each synthetic resin cage 371 (381) according to the aforementioned twelfth and thirteenth embodiments, when R designates the chamfering radius of each roller-propped portion 373 (383) and Da designates the outer diameter of each cylindrical roller, the aforementioned chamfering radius R may be set to satisfy R/Da=0.05 to 0.2 In this case, the contact pressure between the cylindrical roller 336 and the roller-propped portion 373 (383) can be suppressed to be so low that temperature rise due to increase in contact pressure between the cylindrical roller 336 and the roller-propped portion 373 (383) can be avoided. Thus, the lowering of the bearing performance caused by the temperature rise is suppressed so that the improvement in high speed stability or durability can be further advanced.

Incidentally, general engineering plastic such as polyamide resin or the like to which reinforcing fiber or the like is added to improve the mechanical strength can be used as the synthetic resin material for forming the synthetic resin cages related to the double row cylindrical roller bearings according to the present invention. When high-strength synthetic resin improved in mechanical strength more than usual, for example, having a flexural modulus not lower than 10,000 MPa and a specific gravity not higher than 2, is adopted, the quality and the performance can be further improved.

For example, Fortron which is a product registered as trademark of Polyplastics Co., Ltd. or the like is useful as the aforementioned high strength synthetic resin. This has a constitution in which reinforcing fiber (for example, carbon fiber) is added to PPS (initialism of Poly-Phenylene Sulfide) resin having a linear molecular structure having no crosslinking, in accordance with necessity. This overcomes defects of conventional crosslinked PPS resin and increases tensile strength and flexural strength, having elongation and elastic modulus each showing a value about 10 times as large as that of the conventional crosslinked PPS resin.

Figure 29:
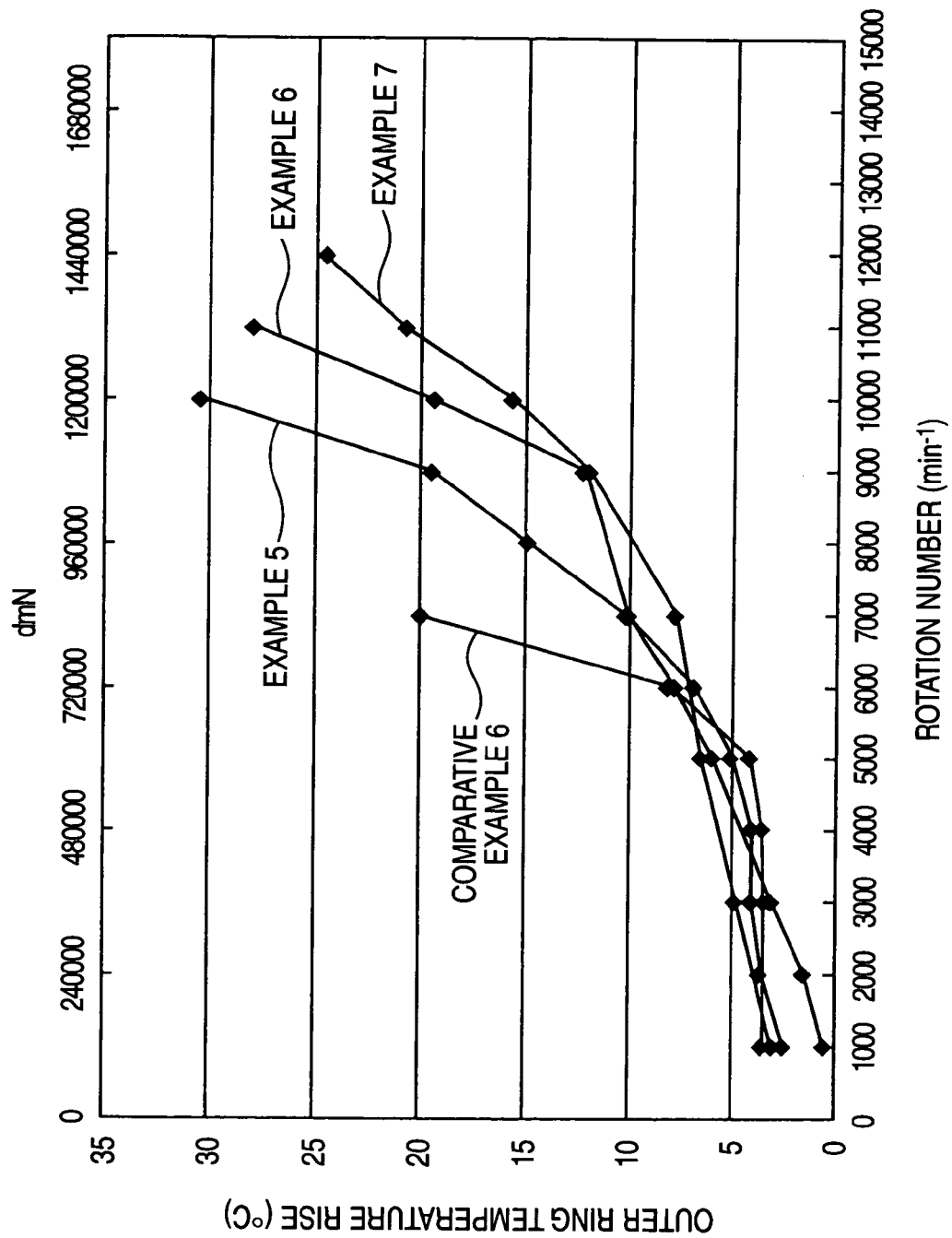
FIGS. 29 and 30 are graphs showing a result of each temperature rise test.

Description will be made about examples related to the double row cylindrical bearings according to the ninth and tenth embodiments of the present invention described above, and comparative examples to be compared with those examples. That is, temperature rise testing for examining a change in outer ring temperature with respect to bearing rotational speed was performed on double row cylindrical roller bearings (NN3019) of Examples 5 to 7 according to the aforementioned first and second embodiments, and a double row cylindrical roller bearing of Comparative Example 6. FIG. 29 shows the results.

Figure 28:
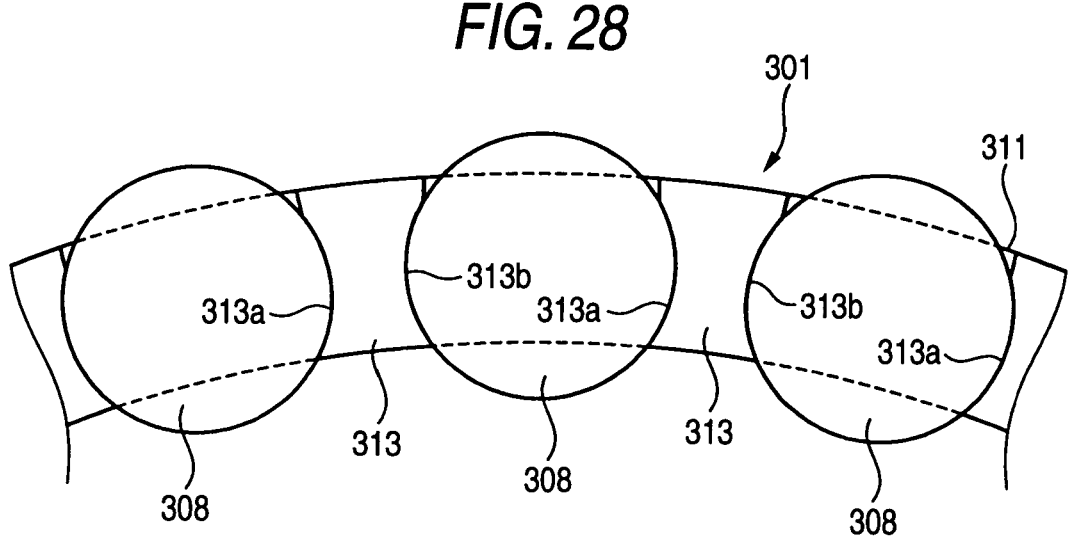
FIG. 28 is a view showing a comparative example.

Incidentally, polyamide resin cages formed as shown in FIGS. 23 and 24 were used in the double row cylindrical roller bearings of Examples 5 and 6, and high strength synthetic resin cages formed as shown in FIG. 23 were used in Example 7. On the other hand, polyamide resin cages 301 formed as shown in FIG. 28 were used in the double row cylindrical roller bearings of Comparative Example 6, in which all the region of each pocket surface 313a, 313b of each columnar portion 313 was formed into a single circular arc surface having a radius 1.005-1.1 times as large as the radius Ra of each cylindrical roller 308.

Further, 6.6 cc of grease (NBU15) was used as lubricant in the double row cylindrical roller bearings used in the aforementioned Examples 5-7 and Comparative Example 6, and the radial clearance was set at 0 μm.

As a result of the aforementioned testing (see FIG. 29), intermittent abnormal groaning noise was generated at a dmN value of about 700,000 or more in Comparative Example 6. When the rotation number was increased further, the noise changed into continuous abnormal noise, and the cages were broken with abnormal temperature rise in the outer ring at a dmN value of 900,000.

On the other hand, in each Example 5-7 equipped with synthetic resin cages according to the present invention, no abnormal noise occurred till the dmN value reached 1,200,000 or more (1,200,000 dmN in Example 5; 1,330,000 dmN in Example 6, and 1,440,000 dmN in Example 7). Further, any cage was not broken in the rotational range of the testing.

Figure 27:
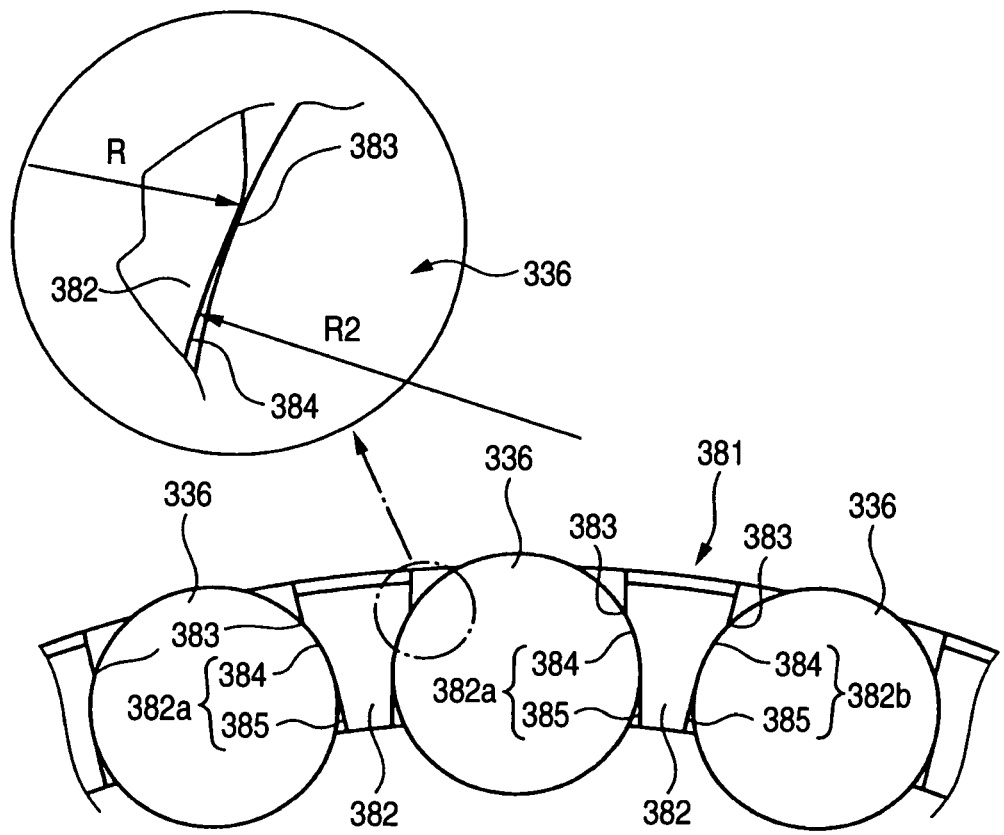
FIG. 27 is a partial front view of a synthetic resin cage in a double row cylindrical roller bearing according to a thirteenth embodiment of the present invention.
Figure 30:
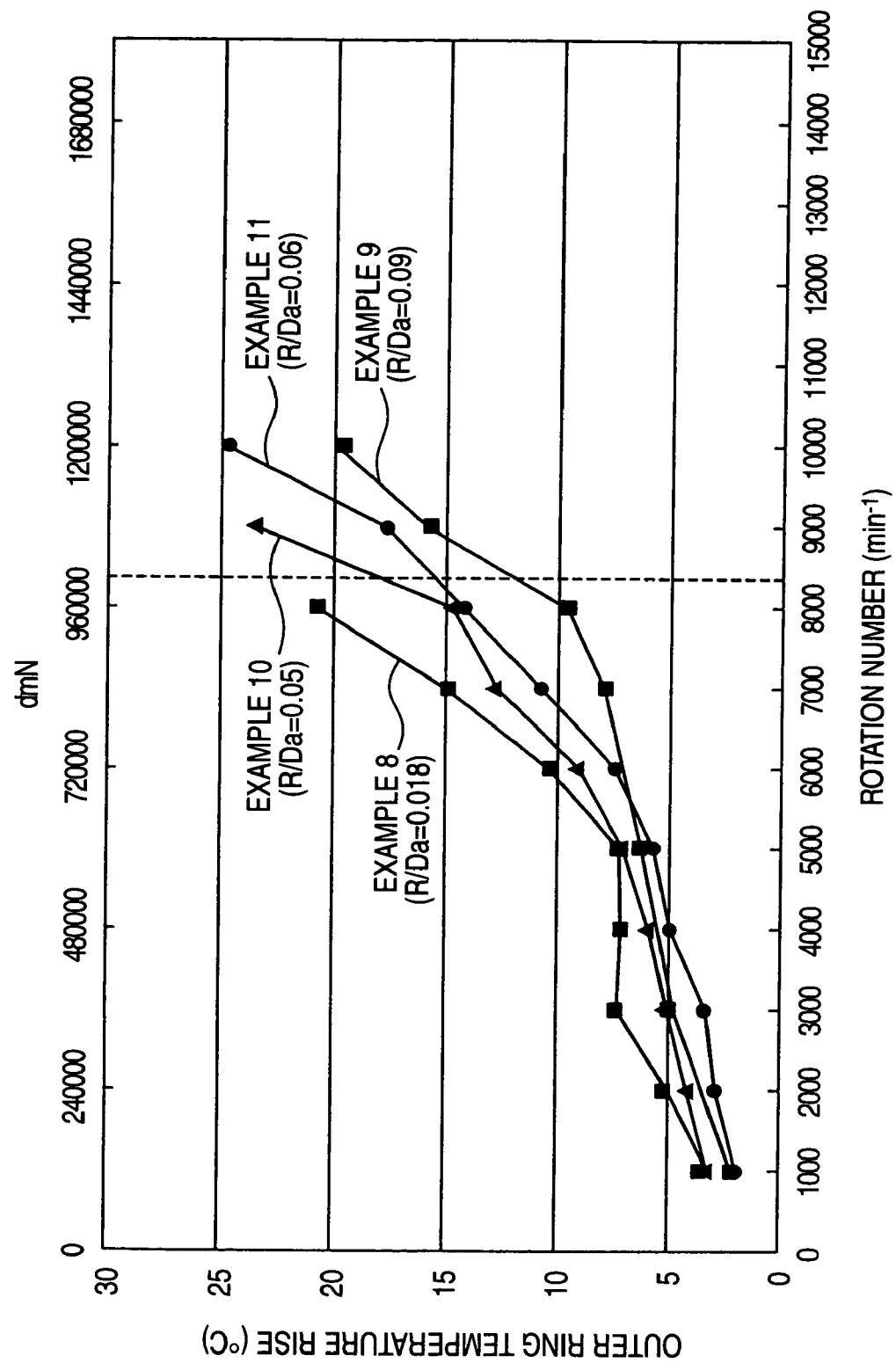
Figure 31:
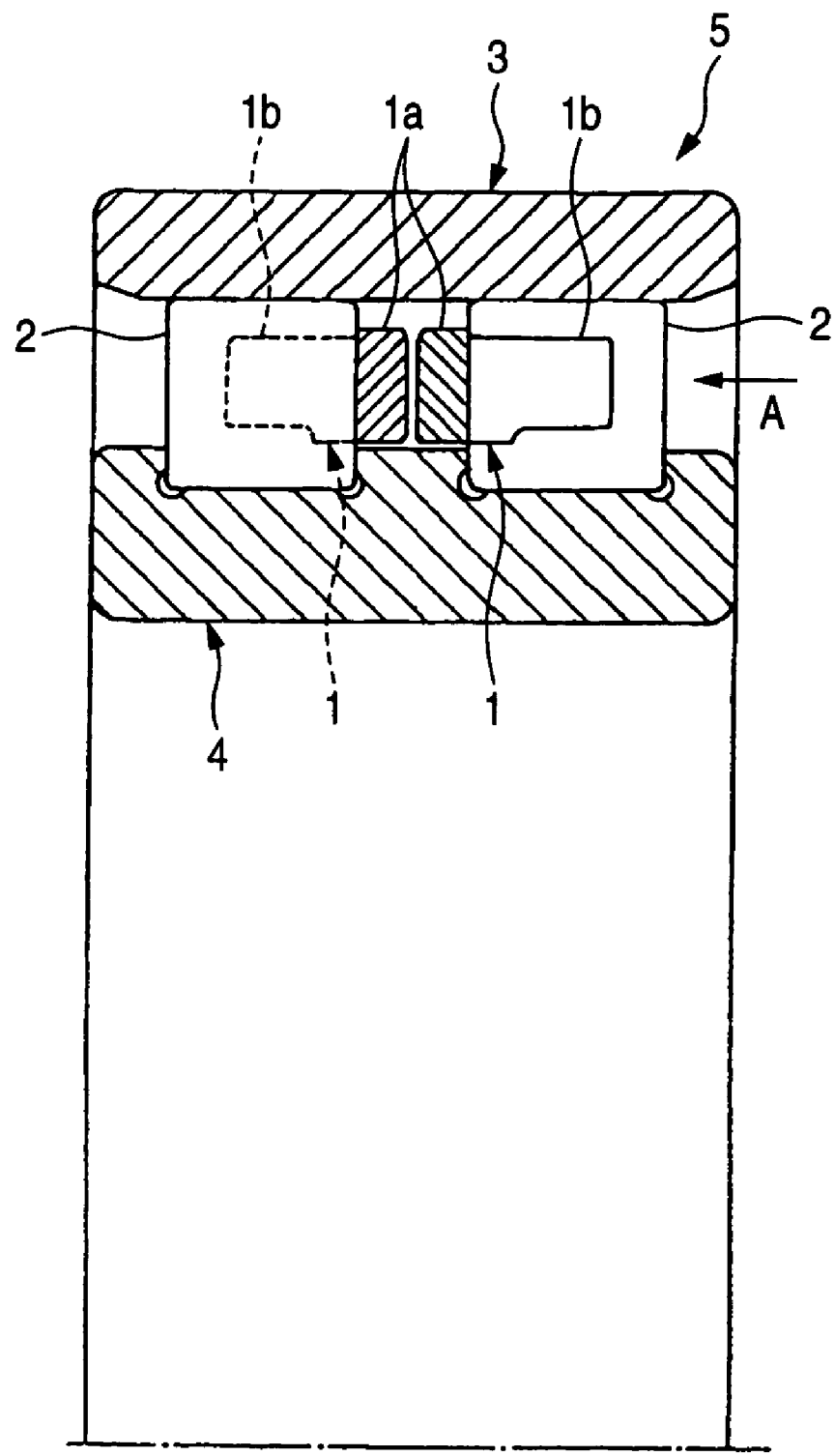
FIG. 31 is a main portion longitudinal sectional view showing cages of a double row cylindrical roller bearing in the background art.
Figure 32:
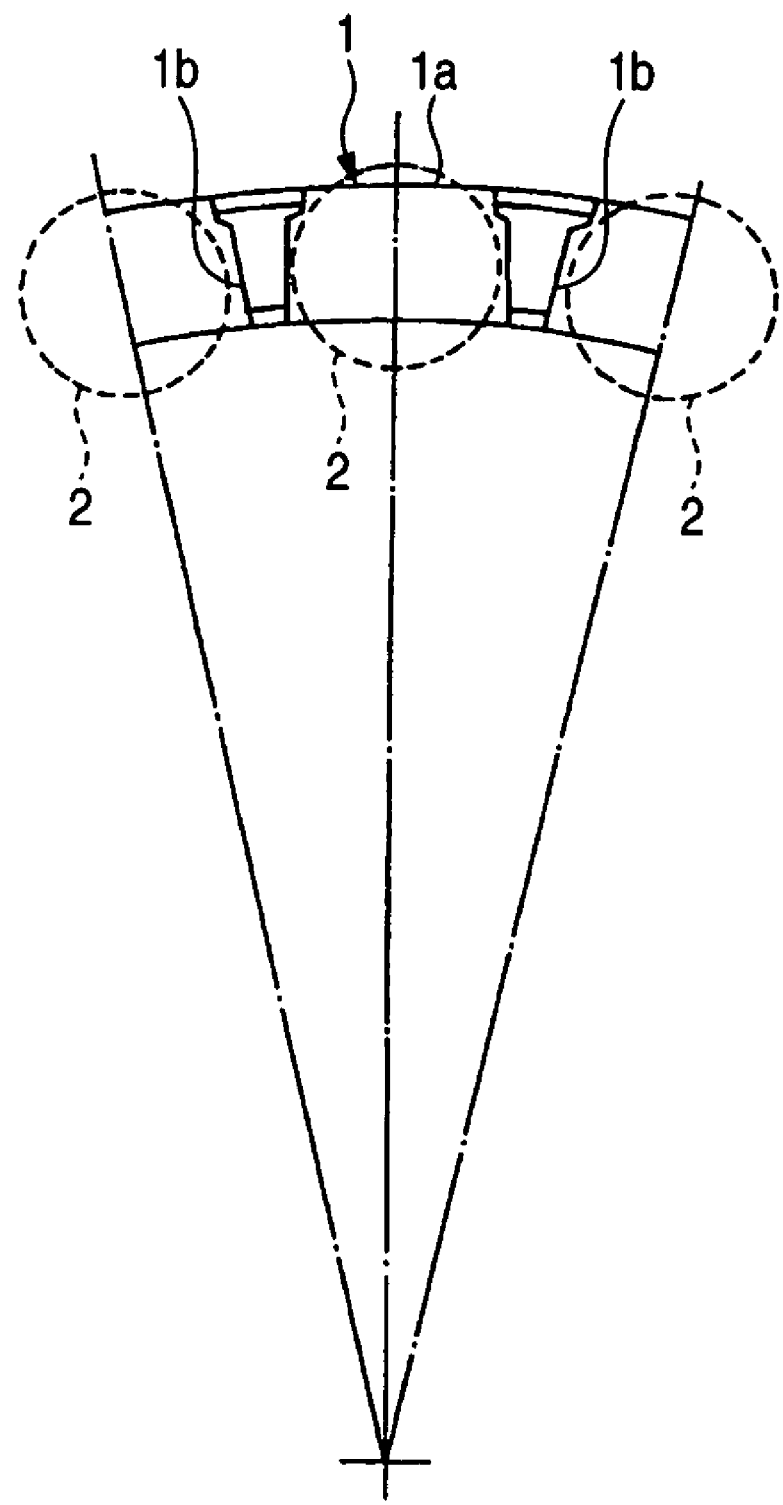
FIG. 32 is a side view from arrow A showing the shape of a side surface of each cage in FIG. 31.
Figure 33:
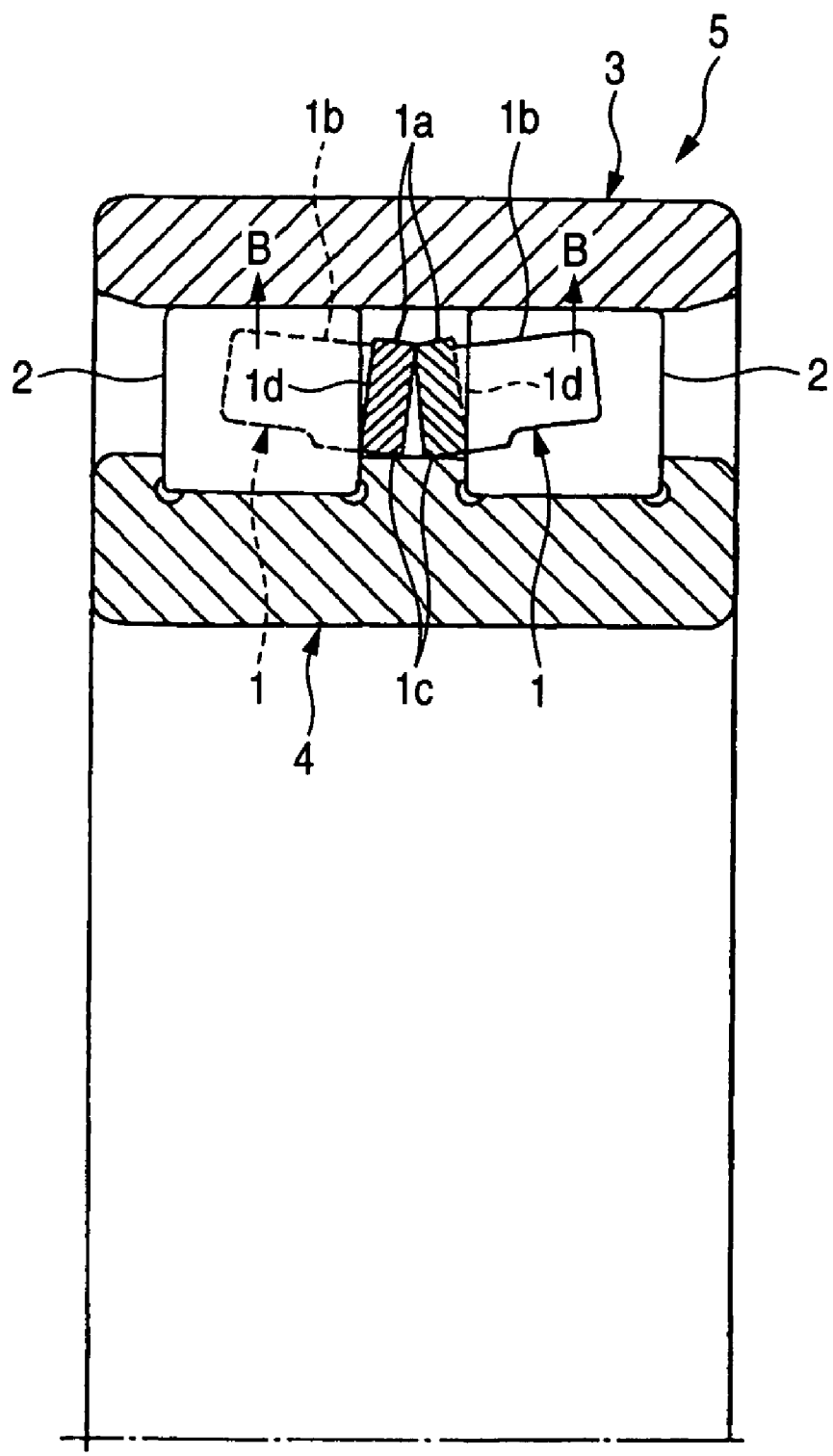
FIG. 33 is a main portion longitudinal sectional view showing the state of the cages elastically deformed due to centrifugal force in FIG. 31.

Next, temperature rise testing for examining a change in outer ring temperature with respect to bearing rotational speed was performed on double row cylindrical roller bearings (NN3019) of Examples 8 to 11 having synthetic resin cages formed in modes shown in FIGS. 25 to 27. FIG. 30 shows the results.

Incidentally, the synthetic resin cages 361 formed in the mode shown in FIG. 25 were used in the double row cylindrical roller bearing of Example 8, in which the chamfering radius R of each roller-propped portion 363 to be chamfered was set at 0.2 mm so that R/Da was set at 0.018.

The synthetic resin cages 371 formed in the mode shown in FIG. 26 were used in the double row cylindrical roller bearing of Example 9, in which R/Da was set at 0.09.

The synthetic resin cages 381 formed in the mode shown in FIG. 27 were used in the double row cylindrical roller bearings of Examples 10 and 11, in which R/Da was set at 0.05 and 0.06 respectively.

Further, 6.6 cc of grease (NBU15) was used as lubricant in the double row cylindrical roller bearings used in the aforementioned Examples 8-11, and the radial clearance was set at 0 μm.

As a result of the aforementioned testing (see FIG. 30), it was proved that when the ratio R/Da of the radius R of the roller-propped portion to the diameter Da of the cylindrical roller was set at 0.05 or more, the contact surface pressure between the cylindrical roller and the roller-propped portion could be suppressed to be low enough not to generate abnormal noise during high speed rotation with a dmN value of 1,000,000 or more, while the interference force between each synthetic resin cage and each cylindrical roller could be suppressed so that abnormal temperature rise can be prevented from occurring.

However, when the aforementioned R/Da increases to be 0.2 or more, the ability to retain the cylindrical rollers is weakened due to deformation after molding the cages or an manufacturing error. Thus, there may occur an adverse effect that the quantity of motion of each synthetic resin cage increases, or the cylindrical rollers fall away from the cage.

It is therefore preferable that the ratio R/Da of the radius R of the roller-propped portion to the diameter Da of the cylindrical roller is set in a range of from 0.05 to 0.2. When the ratio R/Da is set in this range, the lowering of the bearing performance of the double row cylindrical roller bearing due to temperature rise can be suppressed so that improvement in high speed stability or durability can be further advanced.

INDUSTRIAL APPLICABILITY

As described above, a roller bearing or a double row cylindrical roller bearing according to the present invention is useful as a bearing for supporting a rotary piece rotated at a high speed under lubrication with a very small amount of grease or lubricating oil, such as a shaft to be driven by a motor, a main shaft of a machine tool, or the like, and particularly suitable to a roller bearing or a double row cylindrical roller bearing requested to have low heat generation under such an environment.

The invention claimed is:

1. A double row cylindrical roller bearing comprising:
an outer race;
an inner race;
double rows of cylindrical rollers rotatably arrayed between the outer race and the inner race;
pluralities of roller guide cages formed integrally out of synthetic resin for each row of the double rows of rollers, the cages comprising:
an annular portion; and
a plurality of columnar portions disposed circumferentially at predetermined intervals and projecting axially from a roller-side end surface of said annular portion;
wherein the rollers are retained in pockets formed by bearing-circumferential opposite side surfaces of the columnar portions and the roller-side end surface of the annular portion,
the double row cylindrical roller bearing being characterized in that:
a tapered surface is provided on a back surface which is opposite the roller-side end surface of the annular portion, the tapered surface being formed in such a manner that an axial dimension of said back surface is reduced gradually from an inner diameter side of the annular portion to an outer diameter side of the annular portion, an outer side surface of the columnar portion is formed into a tapered surface in which a radial dimension of said columnar portion is reduced gradually as it approaches its axially front end, a straight surface formed on the bearing-circumferential opposite side surfaces of the columnar portion and being located on at least a part of a region on an inner diameter side of a pitch circle diameter, the straight surface not allowing contact pressure between the columnar portion and the cylindrical roller bearing when a free-end side of the columnar portion bends in a direction to expand its diameter due to centrifugal force; and a bearing-inner-diameter-side end portion of the bearing-circumferential side surfaces of the columnar portions retains grease.

2. The double row cylindrical roller bearing, as set forth in claim 1, wherein the bearing-circumferential opposite side surfaces of the columnar portions comprise a roller-propped portion limiting a radial position of the cage itself by abutting against the cylindrical rollers, a separation distance between each of the roller-propped portions is defined as $H1$, a maximum separation distance between each of the straight surfaces is defined as $H2$, and a separation distance between side surfaces of the columnar portions at a bearing inner diameter end portion is defined as $H3$, relation of $H1<H3<H2$ is satisfied.

\* \* \* \* \*